United States Patent
Harada et al.

(10) Patent No.: US 8,731,213 B2
(45) Date of Patent: May 20, 2014

(54) VOICE ANALYZER FOR RECOGNIZING AN ARRANGEMENT OF ACQUISITION UNITS

(75) Inventors: Haruo Harada, Kanagawa (JP); Hirohito Yoneyama, Kanagawa (JP); Kei Shimotani, Kanagawa (JP); Akira Fujii, Kanagawa (JP); Yohei Nishino, Kanagawa (JP); Kiyoshi Iida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 267 days.

(21) Appl. No.: 13/452,231

(22) Filed: Apr. 20, 2012

(65) Prior Publication Data

US 2013/0166298 A1 Jun. 27, 2013

(30) Foreign Application Priority Data

Dec. 26, 2011 (JP) ................................ 2011-284230

(51) Int. Cl.
*H04R 3/00* (2006.01)
(52) U.S. Cl.
USPC ........................................................... 381/92
(58) Field of Classification Search
CPC ...................................................... H04R 3/005
USPC .......................................................... 381/92
See application file for complete search history.

(56) References Cited

U.S. PATENT DOCUMENTS

| | | | | |
|---|---|---|---|---|
| 4,581,758 A | * | 4/1986 | Coker et al. | 381/56 |
| 5,778,082 A | * | 7/1998 | Chu et al. | 381/92 |
| 7,171,007 B2 | * | 1/2007 | Rajan | 381/92 |
| 7,409,065 B2 | * | 8/2008 | Lo | 381/92 |
| 8,005,672 B2 | * | 8/2011 | Vierthaler et al. | 704/233 |
| 8,121,673 B2 | * | 2/2012 | Tran | 600/509 |
| 2004/0064056 A1 | * | 4/2004 | Ogura | 600/490 |
| 2010/0303254 A1 | * | 12/2010 | Yoshizawa et al. | 381/92 |

FOREIGN PATENT DOCUMENTS

| | | |
|---|---|---|
| JP | A-2-74232 | 3/1990 |
| JP | A-2002-165292 | 6/2002 |

* cited by examiner

*Primary Examiner* — Shaun Roberts
(74) *Attorney, Agent, or Firm* — Oliff PLC

(57) ABSTRACT

A voice analyzer includes an apparatus body, a strap that is connected to the apparatus body to make the apparatus body hung from a neck of a wearer, a first voice acquisition unit that acquires a voice of a speaker and is disposed in either a left or right strap when viewed from the wearer, a second voice acquisition unit that acquires the voice of the speaker and is disposed in the opposite strap in which the first voice acquisition unit is disposed, and an arrangement recognition unit that recognizes arrangements of the first and second voice acquisition units, when viewed from the wearer, by comparing a voice signal of the voice acquired by the first voice acquisition unit with sound pressure of a heart sound of the wearer acquired by the second voice acquisition unit.

5 Claims, 21 Drawing Sheets

ENLARGEMENT

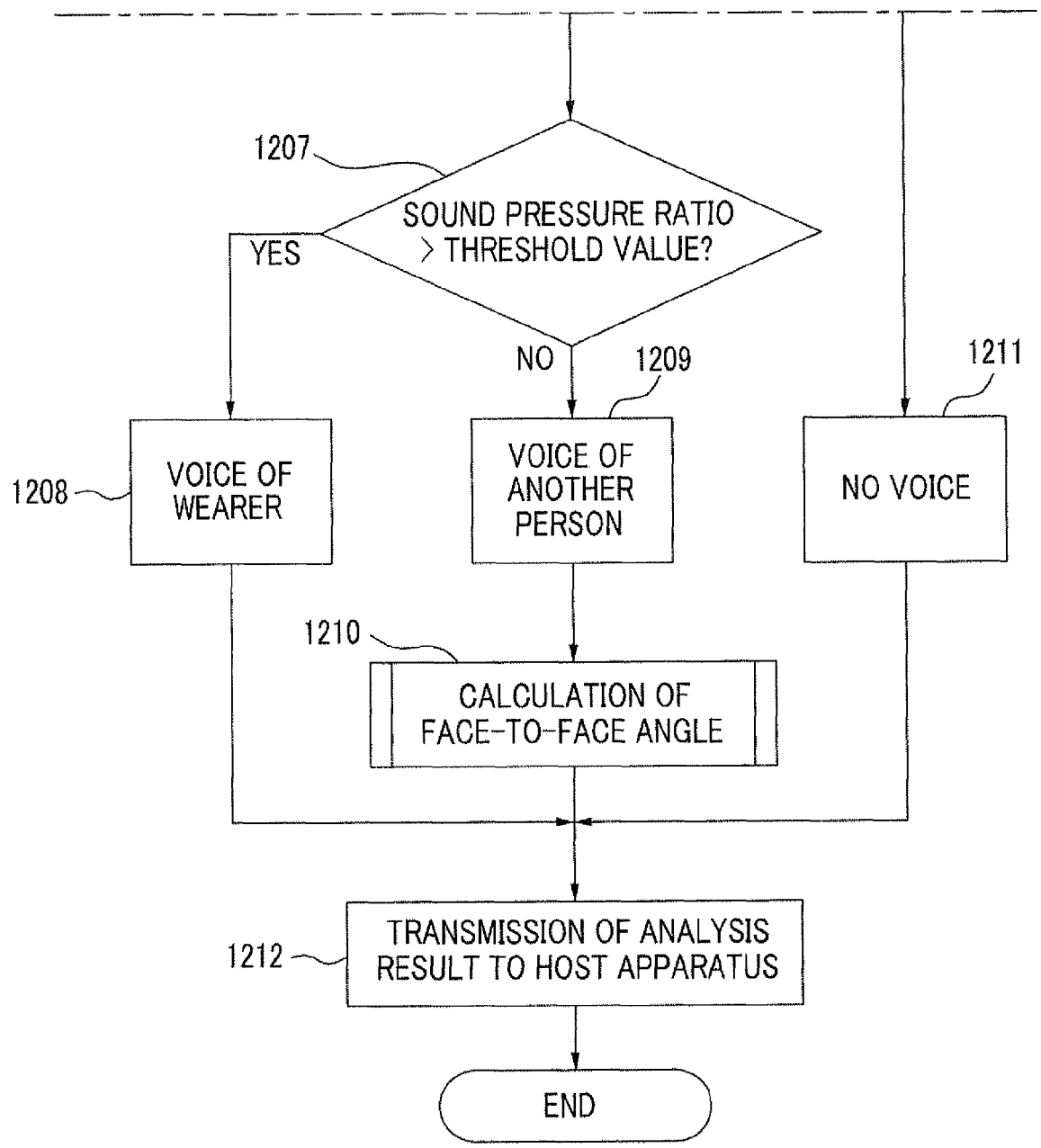

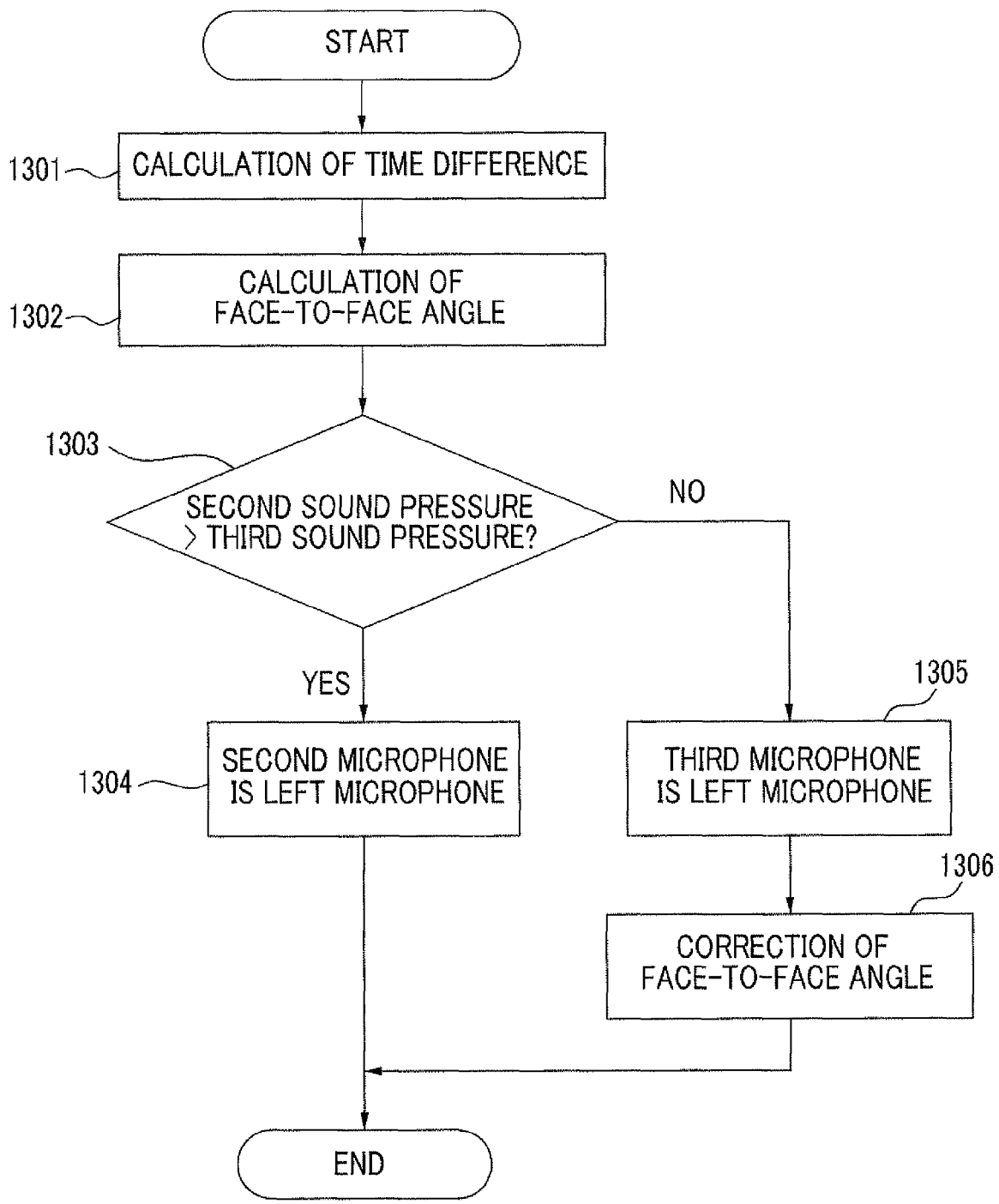

FIG. 16
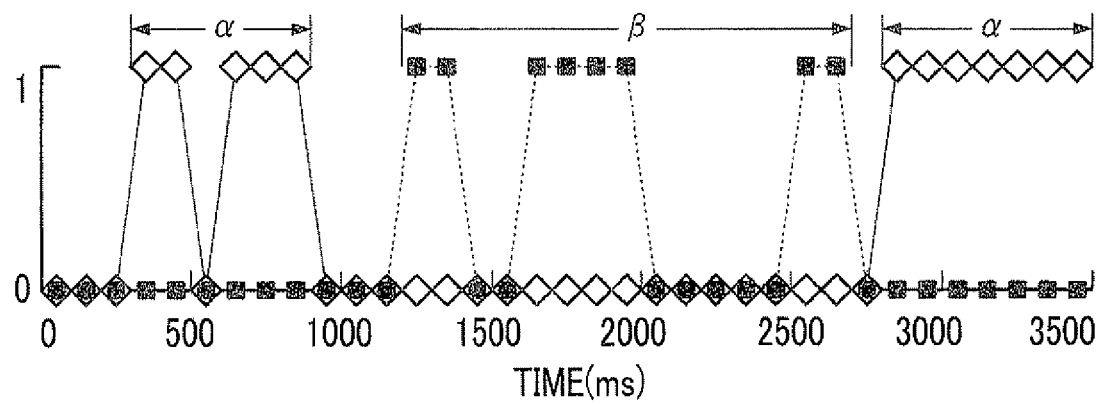
ANALYSIS RESULT OF TERMINAL APPARATUS 10A
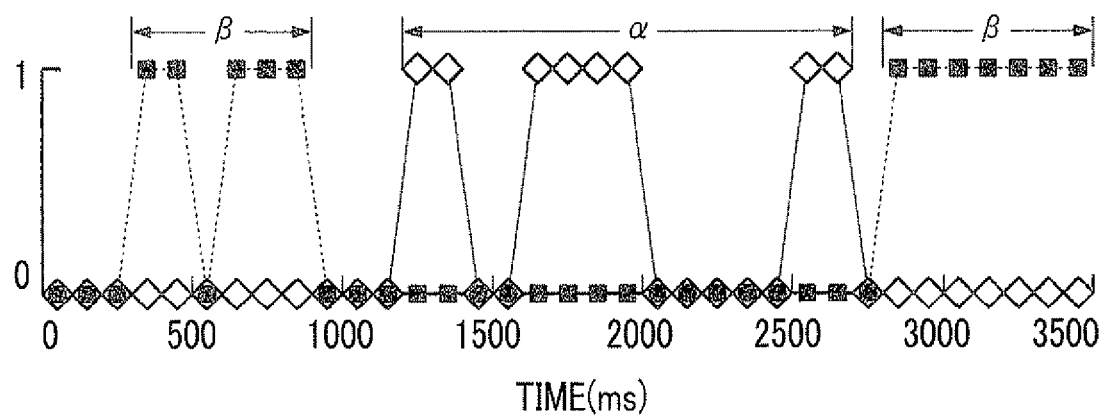
ANALYSIS RESULT OF TERMINAL APPARATUS 10B
- ◇ VOICE OF WEARER
- ▦ VOICE OF ANOTHER PERSON
- α SPEAKING SECTION OF WEARER
- β SPEAKING SECTION OF ANOTHER PERSON

US 8,731,213 B2

VOICE ANALYZER FOR RECOGNIZING AN ARRANGEMENT OF ACQUISITION UNITS

CROSS-REFERENCE TO RELATED APPLICATIONS

This application is based on and claims priority under 35 USC 119 from Japanese Patent Application No. 2011-284230 filed Dec. 26, 2011.

BACKGROUND

1. Technical Field

The present invention relates to a voice analyzer.

2. Summary

According to an aspect of the invention, there is provided a voice analyzer including: an apparatus body; a strap that is connected to the apparatus body and is used to make the apparatus body hung from a neck of a wearer; a first voice acquisition unit that acquires a voice of a speaker and that, when the strap is hung on the neck of the wearer, is disposed in either a left strap or a right strap when viewed from the wearer; a second voice acquisition unit that acquires the voice of the speaker and that, when the strap is hung on the neck of the wearer, is disposed in the opposite strap in which the first voice acquisition unit is disposed; and an arrangement recognition unit that recognizes arrangements of the first voice acquisition unit and the second voice acquisition unit indicating whether the first voice acquisition unit and the second voice acquisition unit are disposed in either the left strap or the right strap, when viewed from the wearer, by comparing a voice signal of the voice acquired by the first voice acquisition unit with sound pressure of a heart sound of the wearer acquired by the second voice acquisition unit.

BRIEF DESCRIPTION OF THE DRAWINGS

Exemplary embodiments of the present invention will be described in detail based on the following figures, wherein:

FIG. 13 is a flow chart when a voice analysis unit in the exemplary embodiment calculates a face-to-face angle;

FIG. 16 is a view showing an example of the speaking information of each terminal apparatus in the conversation situation shown in FIG. 15.

DETAILED DESCRIPTION

Hereinafter, an exemplary embodiment of the invention will be described in detail with reference to the accompanying drawings.

Example of the System Configuration

Figure 1:
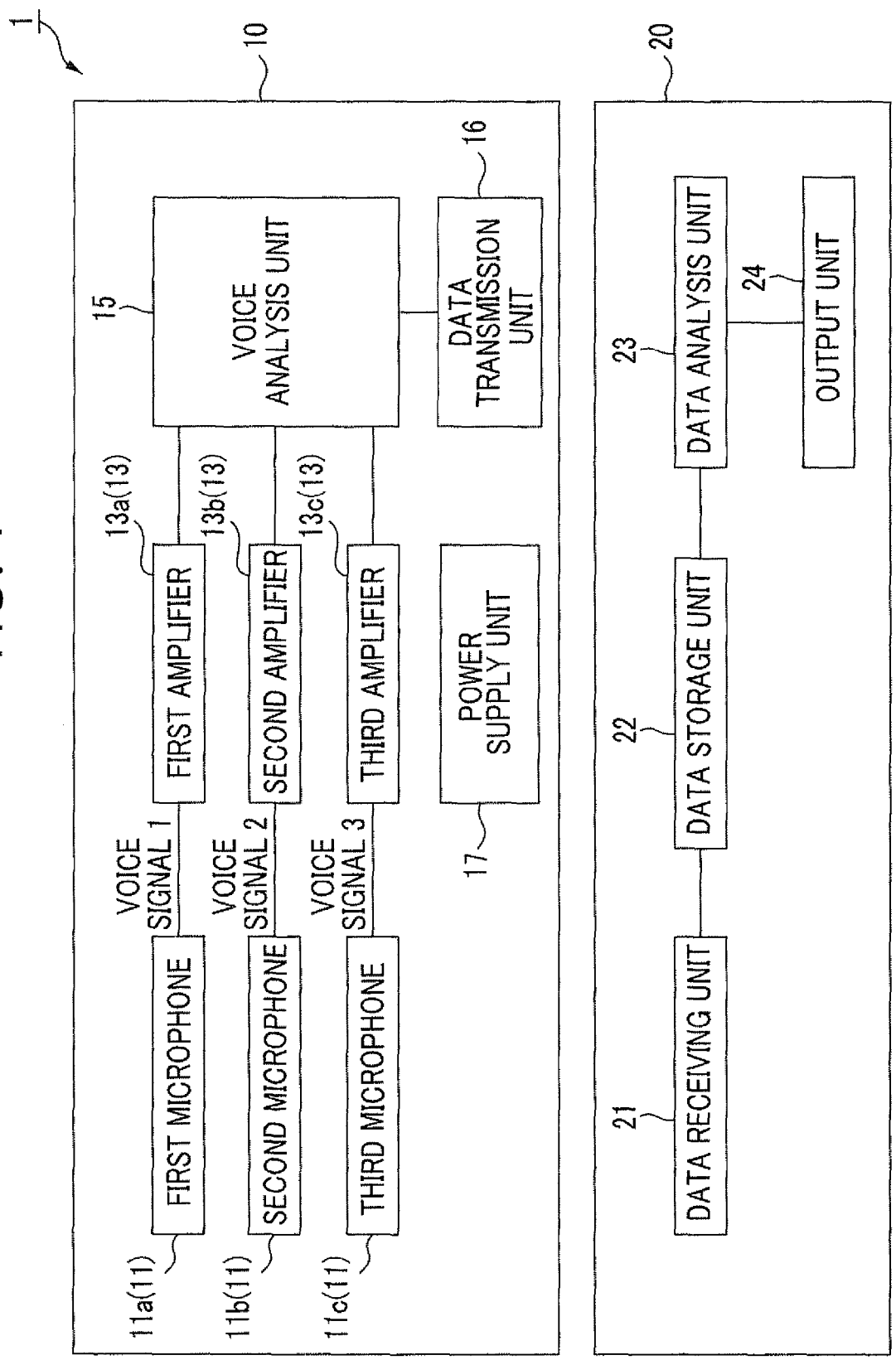
FIG. 1 is a view showing an example of the configuration of a voice analysis system according to an exemplary embodiment.

FIG. 1 is a view showing an example of the configuration of a voice analysis system according to the present exemplary embodiment.

As shown in FIG. 1, the system according to the present exemplary embodiment is configured to include a terminal apparatus 10 and a host apparatus 20. The terminal apparatus 10 and the host apparatus 20 are connected to each other through a wireless communication line. As types of the wireless communication line, lines based on the known methods, such as Wi-Fi (trademark) (Wireless Fidelity), Bluetooth (trademark), ZigBee (trademark), and UWB (Ultra Wideband), may be used. In addition, although only one terminal apparatus 10 is described in the example shown in FIG. 1, the terminal apparatuses 10 as many as users are prepared in practice since the terminal apparatus 10 is used in a state carried on the user. This will be described in detail later. Hereinafter, the user who carries the terminal apparatus 10 is called a wearer.

The terminal apparatus (voice analyzer) 10 includes plural microphones 11 (a first microphone 11a, a second microphone 11b, and a third microphone 11c) and plural amplifiers 13 (a first amplifier 13a, a second amplifier 13b, and a third amplifier 13c) as a voice acquisition unit that acquires the speaker's voice. In addition, the terminal apparatus 10 includes a voice analysis unit 15 that analyzes the acquired voice and a data transmission unit 16 that transmits an analysis result to the host apparatus 20, and further includes a power supply unit 17.

Various types of known microphones, such as a dynamic type microphone and a capacitor type microphone, may be used as the first to third microphones 11a to 11c in the present exemplary embodiment. In particular, it is preferable to use a non-directional HEMS (Micro Electro Mechanical Systems) type microphone. More specifically, it is preferable that the first to third microphones 11a to 11c in the present exemplary embodiment may measure a low frequency (for example, 1 Hz or more). In addition, it is also possible to combine plural microphones. For example, a microphone capable of measuring a low frequency and a microphone capable of measuring a high frequency may be combined.

The first to third amplifiers 13a to 13c amplify electric signals (voice signals) that the first to third microphones 11a to 11c output according to the acquired voice. Known operational amplifiers or the like may be used as the first to third amplifiers 13a to 13c in the present exemplary embodiment.

The voice analysis unit 15 analyzes the voice signals output from the first to third amplifiers 13a to 13c. In addition, the voice analysis unit 15 determines whether the voice acquired by the first to third microphones 11a to 11c is a voice from the wearer, who carries the terminal apparatus 10, or voices from others. That is, the voice analysis unit 15 functions as a speaker identification unit that identifies a speaker of the voice on the basis of voices acquired by the first to third microphones 11a to 11c. In addition, the voice analysis unit 15 identifies whether the speaker is a wearer or another person and measures a face-to-face angle, which is an angle between the wearer and the speaker facing each other, when the speaker is identified as another person. That is, the voice analysis unit 15 functions as an identification unit that identifies whether the speaker is a wearer or another person and also functions as an output unit that measures a face-to-face angle which is an angle between the wearer and the speaker facing each other. Details of specific processing for identification of a speaker and calculation of the face-to-face angle will be described later.

The data transmission unit 16 transmits the acquired data including the analysis result of the voice analysis unit 15 and the ID of the terminal apparatus 10 to the host apparatus through the wireless communication line. As the information transmitted to the host apparatus 20, for example, information regarding the voice acquisition time, sound pressure of the acquired voice, and the like of the first to third microphones 11a to 11c may be included in addition to the analysis result according to processing performed in the host apparatus 20. In addition, a data storage unit that stores the analysis result of the voice analysis unit 15 may be provided in the terminal apparatus 10, and data stored for a certain period of time may be collectively transmitted. The data may be transmitted through a cable line.

The power supply unit 17 supplies electric power to the first to third microphones 11a to 11c, the first to third amplifiers 13a to 13c, the voice analysis unit 15, and the data transmission unit 16. As a power supply, it is possible to use known power supplies, such as a dry battery and a rechargeable battery, for example. In addition, the power supply unit 17 includes known circuits, such as a voltage conversion circuit and a charging control circuit, when necessary.

The host apparatus 20 includes a data receiving unit 21 that receives the data transmitted from the terminal apparatus 10, a data storage unit 22 that stores the received data, a output unit 24 that outputs an analysis result. The host apparatus 20 is realized by an information processing apparatus, such as a personal computer, for example. Moreover, in the present exemplary embodiment, the plural terminal apparatuses 10 are used as described above, and the host apparatus 20 receives the data from each of the plural terminal apparatuses 10.

The data receiving unit 21 corresponds to the wireless communication line described above, and receives the data from each terminal apparatus 10 and transmits it to the data storage unit 22. The data storage unit 22 is realized by a memory of a magnetic disk device of a personal computer, for example, and stores the received data acquired from the data receiving unit 21 for each speaker. Here, identification of a speaker is performed on the basis of a terminal ID transmitted from the terminal apparatus 10 and a combination of a speaker name and a terminal ID registered in the host apparatus 20 in advance. In addition, instead of the terminal ID, a wearer name may be transmitted from the terminal apparatus 10.

The data analysis unit 23 is realized by a CPU program-controlled by a personal computer, for example, and analyzes the data stored in the data storage unit 22. As the specific analysis content and analysis method, various kinds of content and methods may be adopted depending on the purpose or aspect of use of the system according to the present exemplary embodiment. For example, the frequency of conversation between wearers of the terminal apparatus 10 or the tendency of a conversation partner of each wearer is analyzed, or the relationship of speakers in a conversation is estimated from the information regarding the length or sound pressure of each voice in the conversation.

The output unit 24 outputs an analysis result of the data analysis unit 23 or performs output based on the analysis result. As the output unit, various kinds of units including display of a display device, printout using a printer, and voice output may be adopted according to the purpose or aspect of use of the system, the content or format of an analysis result, and the like.

Example of the Configuration of a Terminal Apparatus

Figure 2:
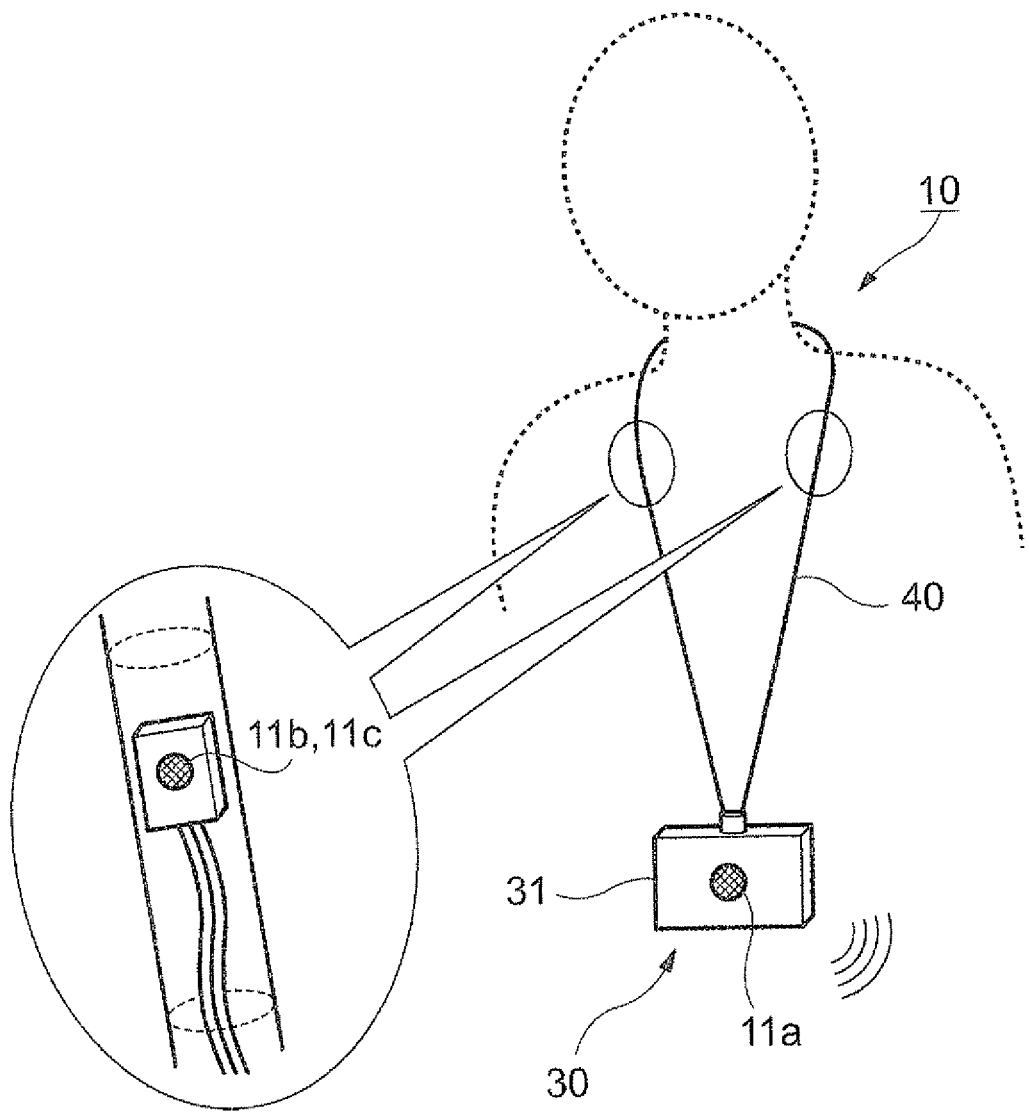
FIG. 2 is a view showing an example of the configuration of a terminal apparatus in the exemplary embodiment.

FIG. 2 is a view showing an example of the configuration of the terminal apparatus 10. As described above, the terminal apparatus 10 is used in a state carried on each user. The terminal apparatus 10 in the present exemplary embodiment is configured to include an apparatus body 30 and a strap 40 connected to the apparatus body 30 so that the user may carry the terminal apparatus 10, as shown in FIG. 2. In the configuration shown in FIG. 2, the user wears the strap 40 on the neck so that the apparatus body 30 is hung from the neck.

The apparatus body 30 is configured such that at least circuits for realizing the first to third amplifiers 13a to 13c, the voice analysis unit 15, the data transmission unit 16, and the power supply unit 17 and a power supply (battery) of the power supply unit 17 are housed in a rectangular parallelepiped thin case 31 formed of metal, resin, or the like. In the example shown in the drawing, the first microphone 11a is provided in the case 31. In addition, a pocket through which an ID card, on which ID information such as the name or team of the wearer is displayed, is inserted may be provided in the case 31. In addition, such ID information or the like may be printed on the surface of the case 31, or a seal on which the ID information or the like is described may be attached to the surface of the case 31.

The second and third microphones 11b and 11c are provided in the strap 40. As materials of the strap 40, it is possible to use known various materials, such as leather, synthetic leather, cotton, other natural fibers, synthetic fiber using resin, and metal. In addition, coating processing using silicon resin, fluorine resin, or the like may be performed. In addition, the strap 40 may be regarded as a holding unit.

The strap 40 has a cylindrical structure, and the second and third microphones 11b and 11c are housed inside the strap 40. By providing the second and third microphones 11b and 11c inside the strap 40, it is possible to prevent damage or contamination of the second and third microphones 11b and 11c, and it is suppressed that a participant in a dialogue is aware of the existence of the second and third microphones 11b and 11c.

Referring to FIG. 2, the first microphone 11a (third voice acquisition unit) and the second microphone 11b are provided in the case 31 and are disposed at different positions, at which distances of sound wave propagation paths from the mouth (speaking portion) of the wearer (hereinafter, simply referred to as "distances") are different, in a state where the wearer wears the strap 40 on the neck so that the apparatus body 30 is hung from the neck. Here, it is assumed that the first microphone 11a is disposed at the position (for example, about 35 cm) far from the mouth (speaking portion) of the wearer and the second microphone 11b is disposed at the position (for example, about 10 cm) near the mouth (speaking portion) of the wearer.

In addition, the second microphone (first voice acquisition unit) 11b and the third microphone (second voice acquisition unit) 11c are disposed so as to be separated from each other by a predetermined distance in the horizontal direction in a state where the terminal apparatus 10 is carried on the wearer. Here, the second and third microphones 11b and 11c are disposed side by side in the horizontal direction in a state where the terminal apparatus 10 is carried on the wearer. For example, the second and third microphones 11b and 11c are disposed so as to be separated from each other by about 15 cm. More specifically, the second and third microphones 11b and 11c are disposed at symmetrical positions when viewed from the wearer. In addition, the second and third microphones 11b and 11c may be regarded as two voice acquisition units.

<Identification of a Speaker (Wearer and Others) Based on Non-Linguistic Information of Acquired Voice>

Next, a method of identifying a speaker in the present exemplary embodiment will be described.

The system according to the present exemplary embodiment identifies a voice of the wearer of the terminal apparatus 10 or voices of others using the voice information acquired by the first and second microphones 11a and 11b provided in the terminal apparatus 10. In other words, in the present exemplary embodiment, it is determined whether the speaker of the acquired voice is a wearer or others. In addition, in the present exemplary embodiment, speaker identification is performed on the basis of the non-linguistic information, such as sound pressure (volume input to the microphone 11) instead of the linguistic information acquired using morphological analysis or dictionary information of the information regarding the acquired voice. That is, a speaker of the voice is identified from the speaking situation specified by the non-linguistic information instead of the content of speaking specified by the linguistic information.

As described with reference to FIGS. 1 and 2, in the present exemplary embodiment, the first microphone 11a of the terminal apparatus 10 is disposed at the position far from the mouth (speaking portion) of the wearer and the second microphone 11b is disposed at the position near the mouth (speaking portion) of the wearer. That is, assuming that the mouth (speaking portion) of the wearer is a sound source, the distance between the first microphone 11a and the sound source is greatly different from the distance between the second microphone 11b and the sound source. Specifically, the distance between the first microphone 11a and the sound source is about 1.5 to 4 times the distance between the second microphone 11b and the sound source. Here, sound pressure of the acquired voice in the microphone 11 decreases as the distance between the microphone 11 and the sound source increases (distance decrease). Therefore, for the voice of the wearer, the sound pressure of the acquired voice in the first microphone 11a is greatly different from the sound pressure of the acquired voice in the second microphone 11b.

On the other hand, assuming that the mouth (speaking portion) of a person other than the wearer (another person) is a sound source, the distance between the first microphone 11a and the sound source and the distance between the second microphone 11b and the sound source do not change greatly since another person is separated from the wearer. Although there may be a difference between both the distances depending on the position of another person with respect to the wearer, the distance between the first microphone 11a and the sound source is not several times the distance between the second microphone 11b and the sound source except for the case when the mouth (speaking portion) of the wearer is a sound source. Therefore, for the voice of another person, the sound pressure of the acquired voice in the first microphone 11a is not largely different from the sound pressure of the acquired voice in the second microphone 11b as in the case of the voice of the wearer.

Figure 3:
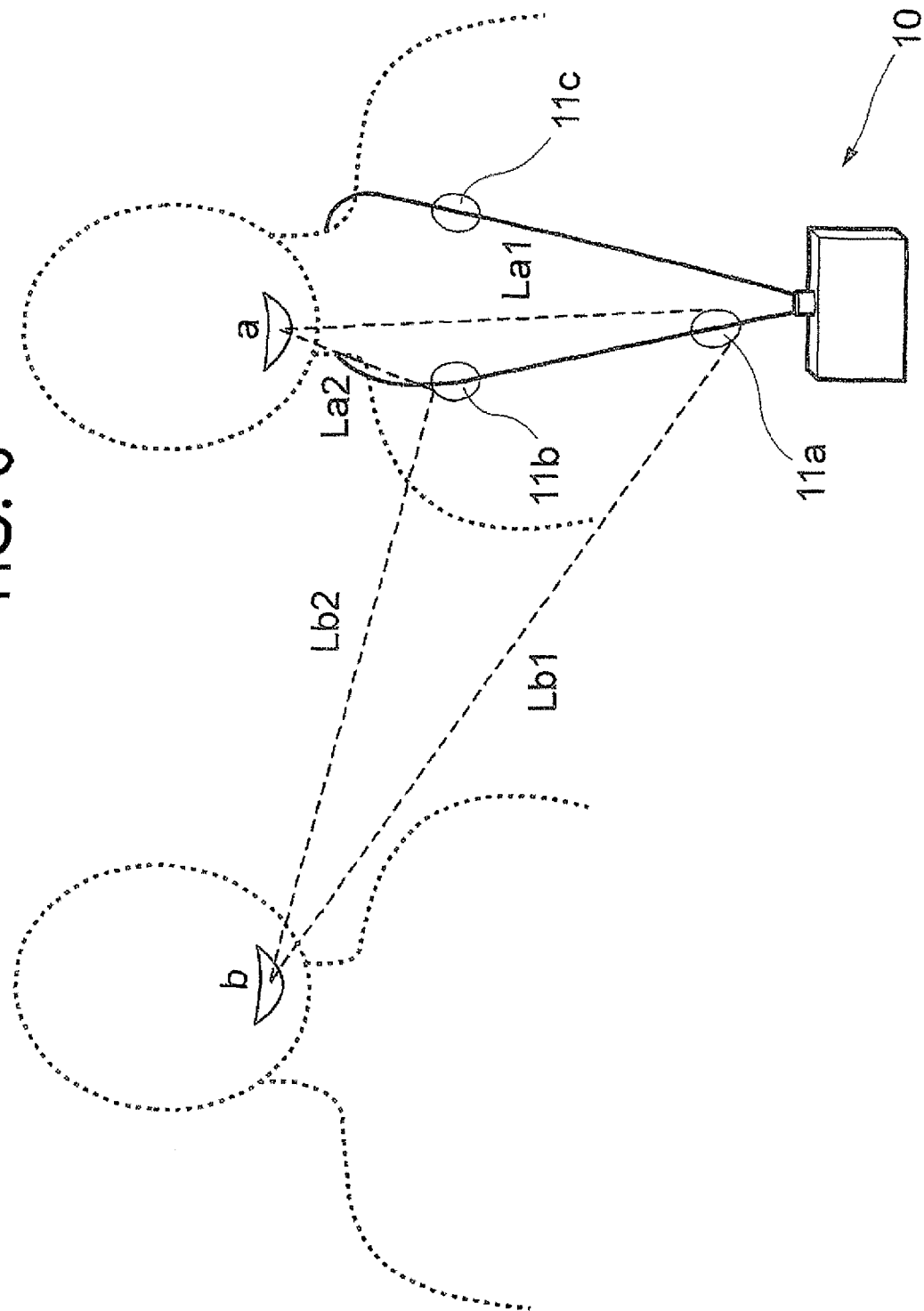
FIG. 3 is a view showing the positional relationship between mouths (speaking portions) of a wearer and another person and a microphone.

FIG. 3 is a view showing the positional relationship between mouths (speaking portions) of a wearer and another person and the microphone 11. In addition, in the example shown in FIG. 3, the first microphone 11a is provided in the strap 40.

In the relationship shown in FIG. 3, the distance between a sound source a, which is a mouth (speaking portion) of the wearer, and the first microphone 11a is set to La1 and the distance between the sound source a and the second microphone 11b is set to La2. In addition, the distance between a sound source b, which is a mouth (speaking portion) of another person, and the first microphone 11a is set to Lb1 and the distance between the sound source b and the second microphone 11b is set to Lb2. In this case, the following relationship is satisfied.

$$La1 > La2(La1 \cong 1.5 \times La2 \sim 4 \times La2)$$

$$Lb1 \cong Lb2$$

Figure 4:
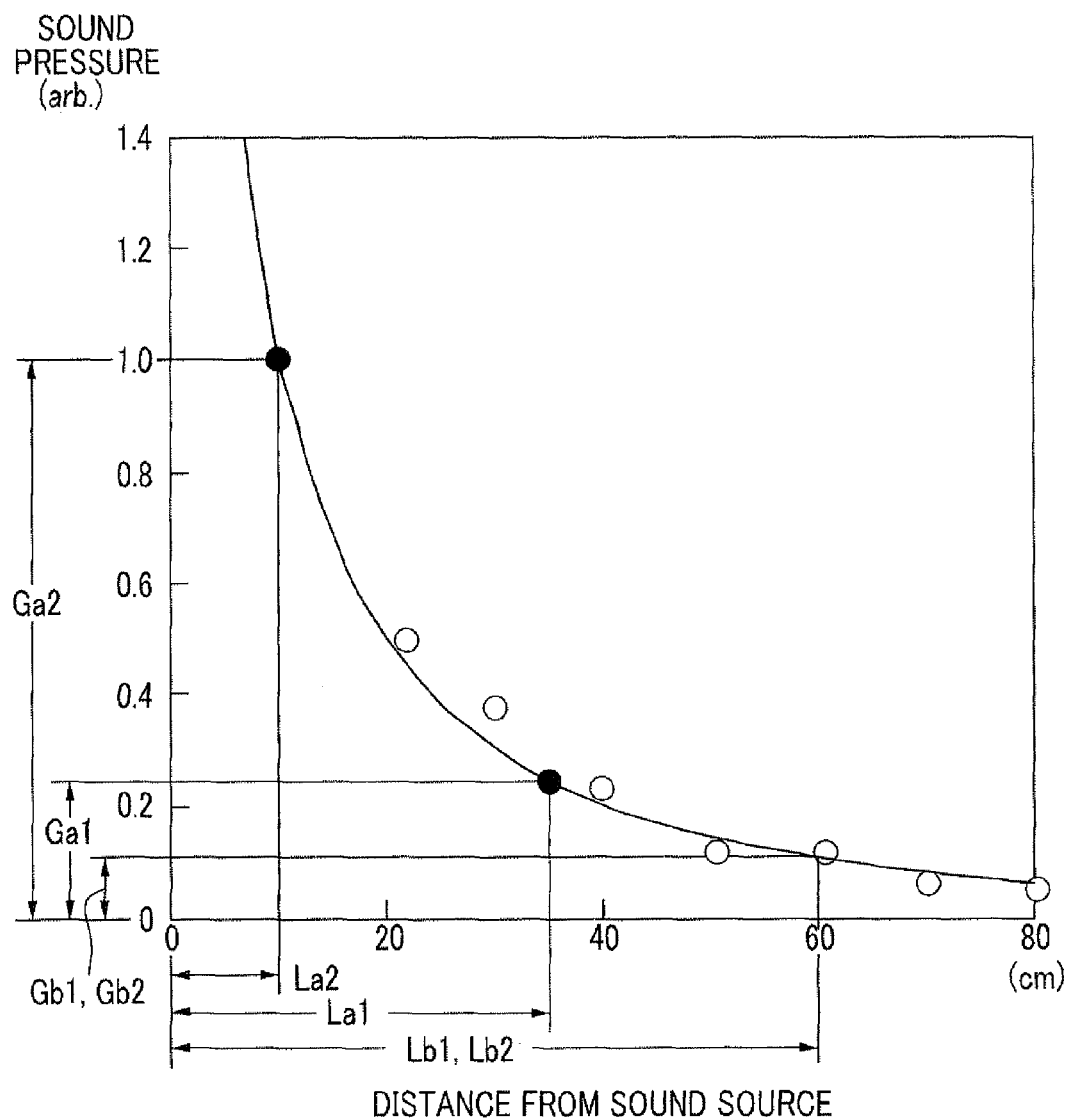
FIG. 4 is a view showing the relationship of the distance of sound wave propagation path between a microphone and a sound source and sound pressure (input volume)

FIG. 4 is a view showing the relationship of the distance between the microphone 11 and the sound source and the sound pressure (input volume).

As described above, the sound pressure is distance-decreases with the distance between the microphone 11 and the sound source. In FIG. 4, when sound pressure (first sound pressure) Ga1 in the case of the distance La1 is compared with sound pressure (second sound pressure) Ga2 in the case of the distance La2, the sound pressure Ga2 is about 4 times the sound pressure Ga1. On the other hand, since the distances Lb1 and Lb2 are approximately equal, sound pressure Gb1 in the case of the distance Lb1 and sound pressure Gb2 in the case of the distance Lb2 are almost equal. In the present exemplary embodiment, therefore, a voice of the wearer and voices of others in the acquired voices are identified using the difference of the sound pressure ratio. In addition, although the distances Lb1 and Lb2 are set to 60 cm in the example shown in FIG. 4, it is meaningful that the sound pressure Gb1 and the sound pressure Gb2 are almost equal, and the distance Lb1 and Lb2 are not limited to the values shown in FIG. 4.

Figure 5:
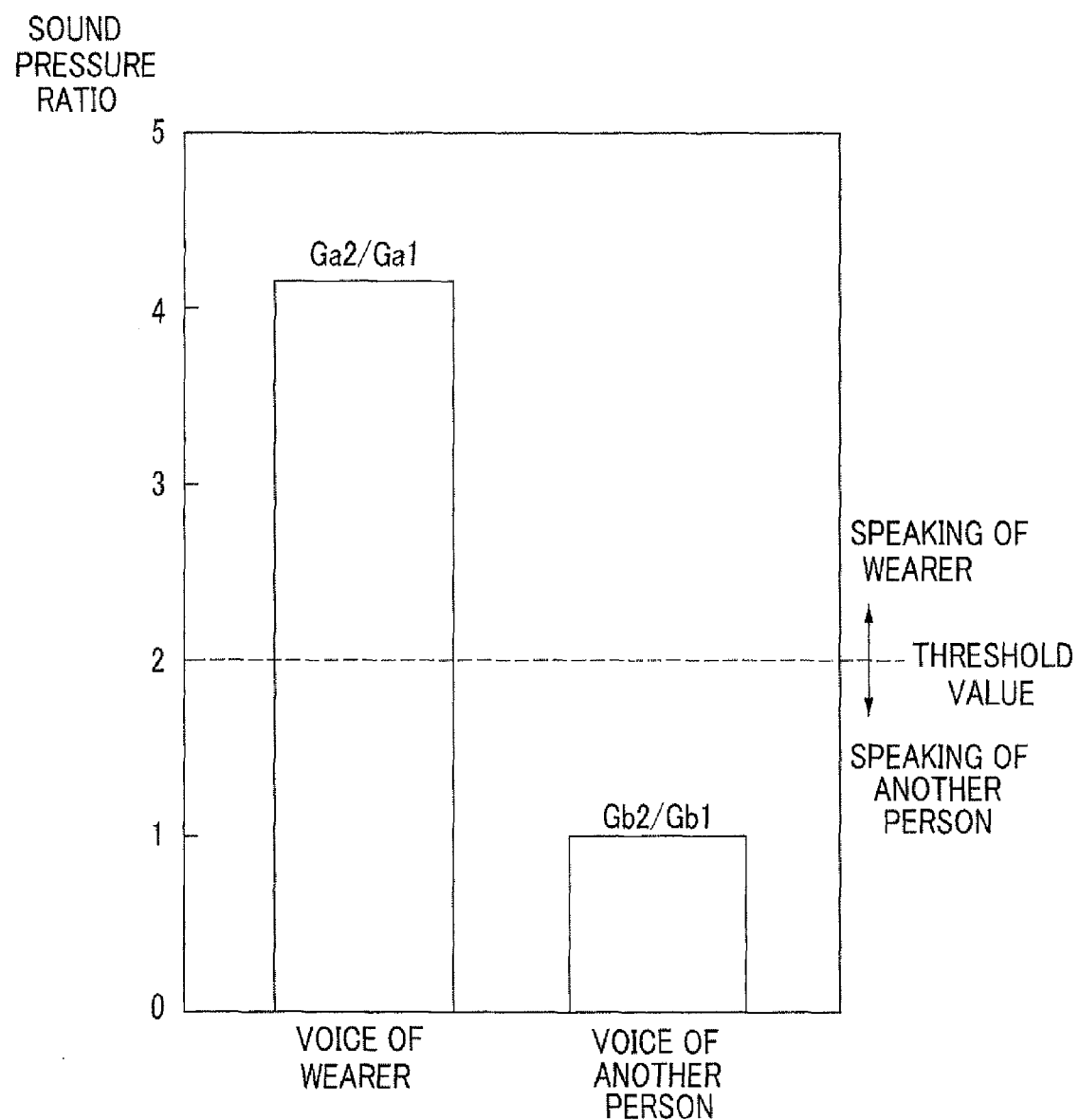
FIG. 5 is a view showing a method of identifying a voice of a wearer and a voice of another person.

FIG. 5 is a view showing a method of identifying a voice of a wearer and a voice of another person.

As described with reference to FIG. 4, for the voice of the wearer, the sound pressure Ga2 of the second microphone 11b is several times (for example, about 4 times) the sound pressure Ga1 of the first microphone 11a. In addition, for the voice of another person, the sound pressure Gb2 of the second microphone 11b is almost equal to (about 1 time) the sound pressure Gb1 of the first microphone 11a. In the present exemplary embodiment, therefore, a threshold value is set to the ratio of the sound pressure of the second microphone 11b and the sound pressure of the first microphone 11a. The threshold value is set to a value between the value of the sound pressure ratio in the voice of the wearer and the value of the sound pressure ratio in the voice of another person. In addition, a voice with a larger sound pressure ratio than the threshold value is determined to be the voice of the wearer, and a voice with a smaller sound pressure ratio than the threshold value is determined to be the voice of another person. In the example shown in FIG. 5, the threshold value is set to 2. Since the sound pressure ratio Ga2/Ga1 exceeds the threshold value 2, the voice is determined to be the voice of the wearer. In addition, since the sound pressure ratio Gb2/Gb1 is smaller than the threshold value 2, the voice is determined to be the voice of another person.

Moreover, in the example described above, determination regarding whether the voice is a voice of the wearer or voices of others is performed using the first and second microphones 11a and 11b. However, the invention is not limited to this, but the same is true even if the first and third microphones 11a and 11c are used.

<Explanation Regarding the Face-to-Face Angle>

Figure 6:
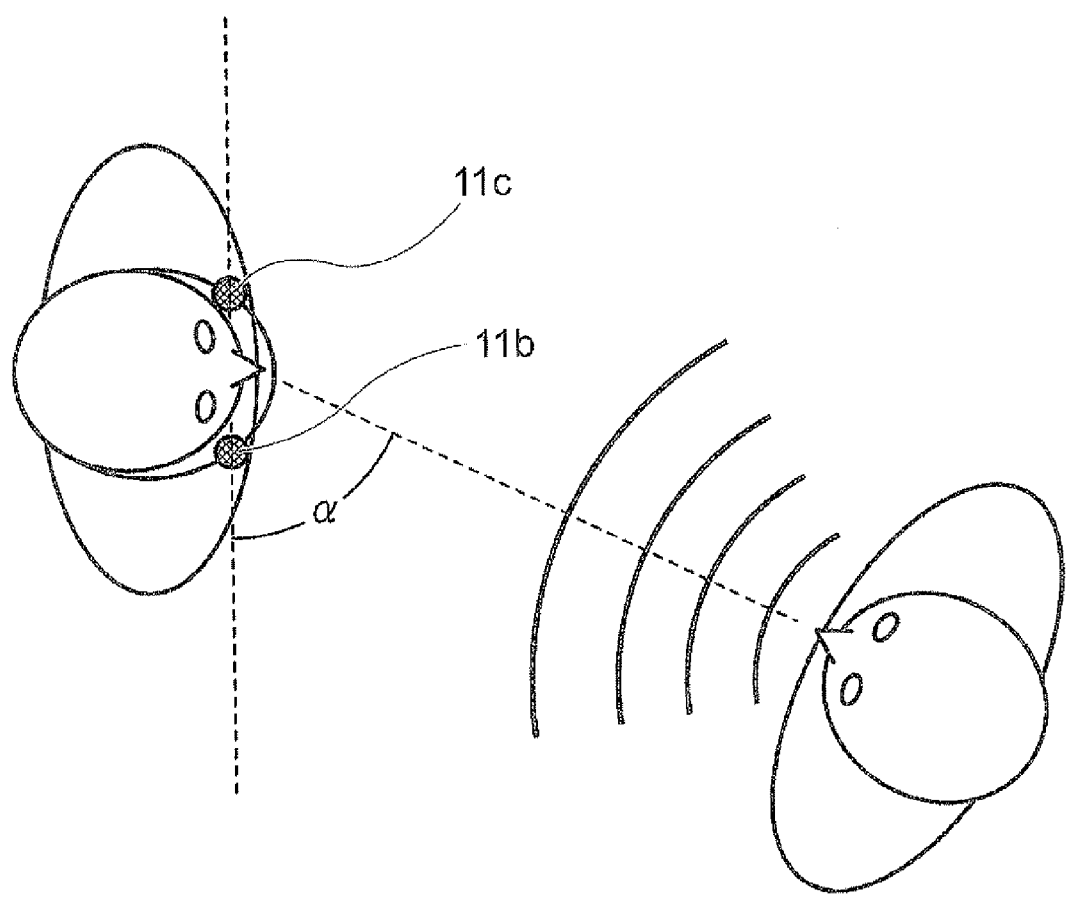
FIG. 6 is a view illustrating a face-to-face angle in the exemplary embodiment.

FIG. 6 is a view illustrating the face-to-face angle in the present exemplary embodiment.

In the present exemplary embodiment, the face-to-face angle is an angle between a wearer of the terminal apparatus 10 and a speaker facing each other. In addition, FIG. 6 shows a horizontal face-to-face angle as an example of the face-to-face angle defined in the present exemplary embodiment. That is, FIG. 6 is a view when the wearer and the speaker are viewed from above their heads. Moreover, in the present exemplary embodiment, the angle between the line segment, which connects the second and third microphones 11b and 11c that are two voice acquisition units, and the line segment, which connects the midpoint of the above line segment to the speaker, is adopted as the face-to-face angle α. In this way, mathematical handling of the face-to-face angle becomes easier. In addition, when this definition is adopted, for example, when the wearer and the speaker face each other in front of each other, the face-to-face angle α between two persons is 90°.

<Explanation Regarding a Method of Calculating the Face-to-Face Angle>

Figure 7:
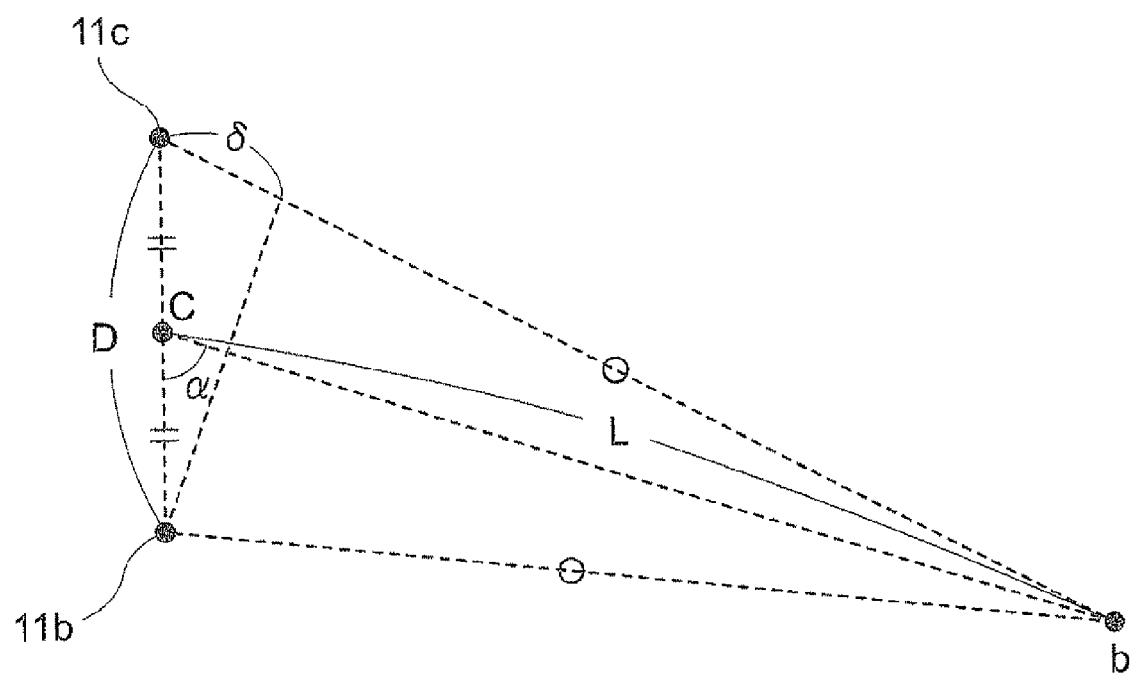
FIG. 7 is a view illustrating a method of calculating the face-to-face angle using second and third microphones.

FIG. 7 is a view illustrating a method of calculating the face-to-face angle α using the second and third microphones 11b and 11c.

Here, the voice emitted from the sound source b, which is the mouth (speaking portion) of another person, spreads concentrically from the sound source b. However, the voice spreads at the speed of sound that is a limited speed. Accordingly, time taken until the voice reaches the second microphone 11b is different from time taken until the voice reaches the third microphone 11c. As a result, a time difference Δt corresponding to the voice path difference δ occurs. In addition, assuming that the distance between the second and third microphones 11b and 11c is D and the distance between the midpoint C and the sound source b is L, the following Expression (1) is satisfied.

$$\delta = (L^2 + LD \cos \alpha + D^2/4)^{0.5} - (L^2 - LD \cos \alpha + D^2/4)^{0.5} \quad (1)$$

In the case of L>D, the influence of L is small. Accordingly, Expression (1) may be approximated to the following Expression (2).

$$\delta \cong D \cos \alpha \quad (2)$$

In addition, if the sound speed c and the time difference Δt are used, the following Expression (3) is satisfied.

$$\delta = c\Delta t \quad (3)$$

That is, the face-to-face angle α may be calculated using Expressions (2) and (3). That is, the face-to-face angle α that is an angle between a wearer and a speaker facing each other may be measured on the basis of the time difference Δt when the voice of the speaker reaches the second and third microphones 11b and 11c, which are two voice acquisition units, and the distance D between the second and third microphones 11b and 11c.

In addition, the time difference Δt when the voice of the speaker reaches the second and third microphones 11b and 11c may be calculated as follows.

Figure 8A:
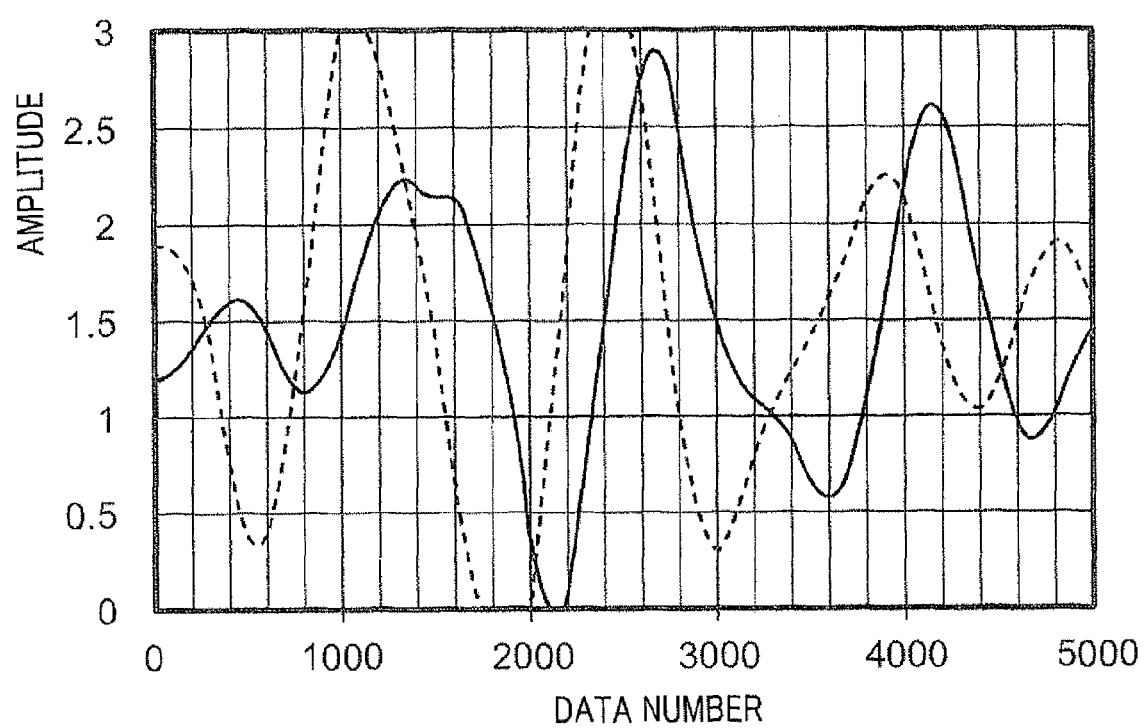
FIGS. 8A to 8C are views illustrating a method of calculating a time difference in the exemplary embodiment.
Figure 8B:
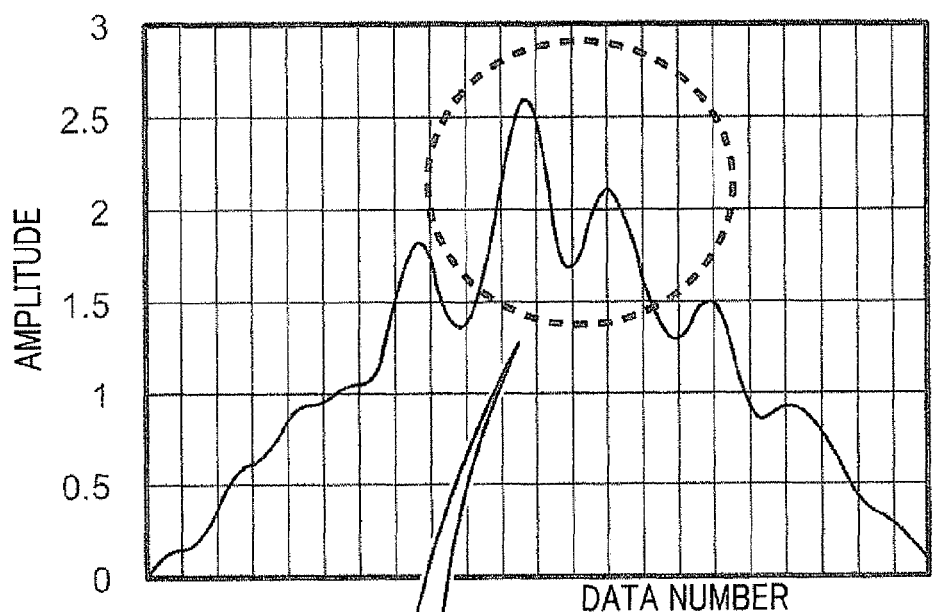
Figure 8C:
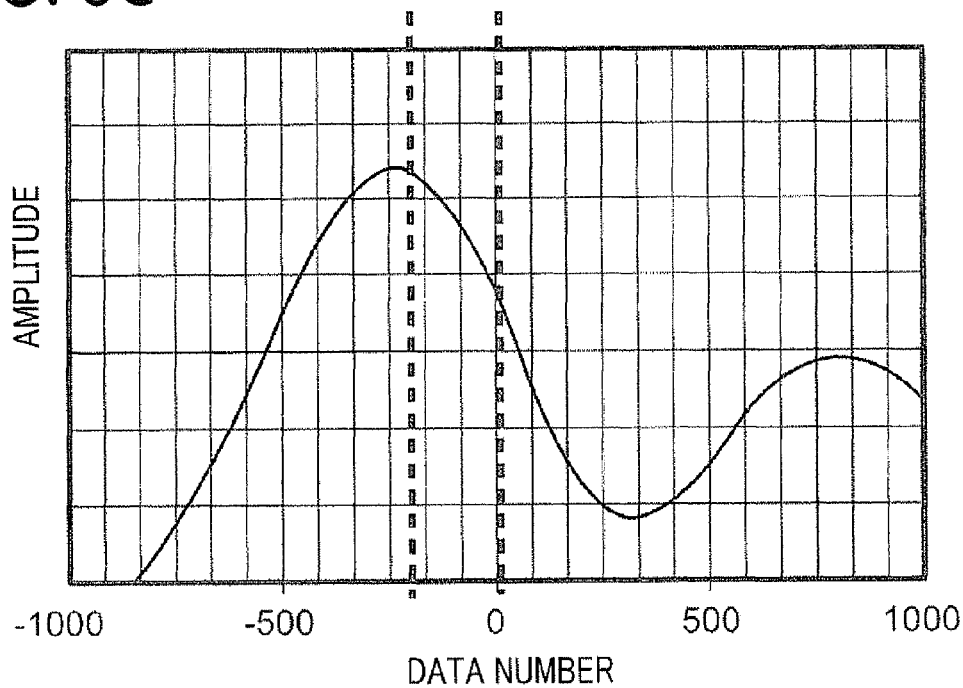

FIGS. 8A to 8C are views illustrating a method of calculating the time difference Δt in the present exemplary embodiment. FIG. 8A is a view when the voice of a speaker reaching the second and third microphones 11b and 11c is sampled at the sampling frequency of 1 MHz and consecutive 5000 points are extracted from the data.

Here, the horizontal axis indicates a data number given to the data of 5000 points, and the vertical axis indicates the amplitude of the voice of a speaker. In addition, the solid line indicates a waveform signal of the voice of the speaker reaching the second microphone 11b, and the dotted line indicates a waveform signal of the voice of the speaker reaching the third microphone 11c.

In the present exemplary embodiment, a cross-correlation function of these two waveform signals is calculated. That is, one waveform signal is fixed and the other waveform signal is shifted for calculation taking the sum of products. FIGS. 8B and 8C are views showing a cross-correlation function for these two waveform signals. FIG. 8B is a cross-correlation function of all data items of the sampled 5000 points, and FIG. 8O is an enlarged view of the vicinity of the peak of the cross-correlation function shown in FIG. 8B. In addition, FIGS. 8B and 8C show the case where the cross-correlation function is calculated by fixing a waveform signal of the voice of the speaker reaching the second microphone 11b and shifting a waveform signal of the voice of the speaker reaching the third microphone 11a.

As shown in FIG. 8O, the peak position with the data number 0 as a reference is shifted by −227 points. This means that the voice of a speaker reaching the third microphone 11a is delayed by the −227 points with the second microphone 11b as a reference. Since the sampling frequency in the present exemplary embodiment is 1 MHz as described above, time between the sampled data items is $1 \times 10^{-6}$ (s). Accordingly, this delay time is set to $227 \times 1 \times 10^{-6}$ (s)=227 (μs). That is, the time difference Δt in this case is 227 (μs).

Moreover, in the present exemplary embodiment, the amplitude is divided into predetermined frequency bands and large weighting is given to the frequency band with the largest amplitude to thereby calculate the cross-correlation function. The time difference Δt calculated in this way becomes more accurate. In addition, it is preferable that the distance between the second and third microphones 11b and 11c falls within the range of 1 cm to 100 cm in order to calculate the time difference Δt more accurately. If the distance between the second and third microphones 11b and 11c is smaller than 1 cm, the time difference Δt becomes too small. As a result, the error of the face-to-face angle derived thereafter tends to be larger. In addition, if the distance between the second and third microphones 11b and 11c is larger than 100 cm, the influence of a reflected voice increases when deriving the time difference Δt. In addition, when calculating the cross-correlation function, it is necessary to perform calculation for the longer time width. As a result, the load required for the calculation becomes large.

Figure 9:
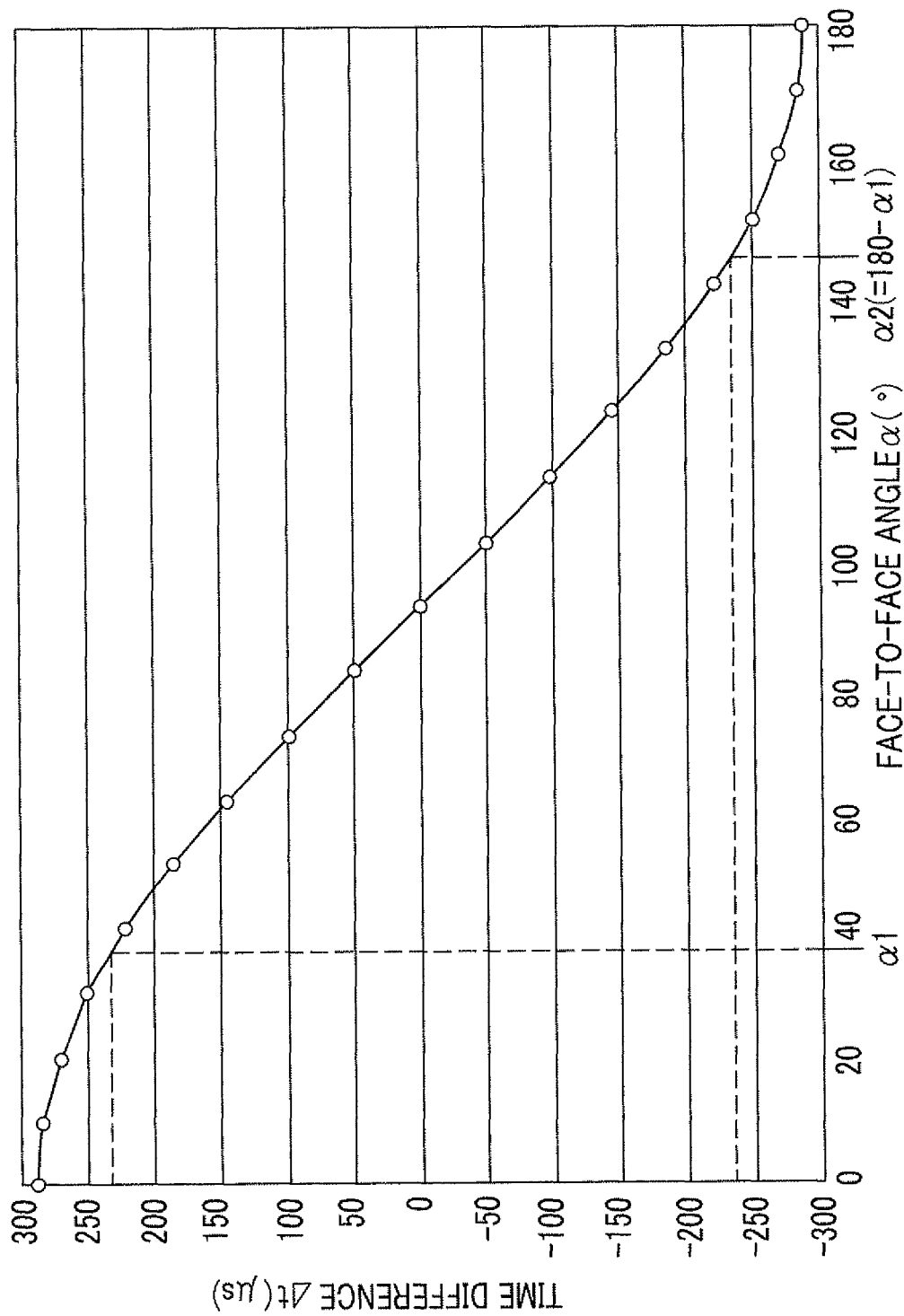
FIG. 9 is a view showing the relationship between the face-to-face angle and the time difference when the voice of a speaker reaches second and third microphones.

FIG. 9 is a view showing the relationship between the face-to-face angle α and the time difference Δt when the voice of the speaker reaches the second and third microphones 11b and 11c. In FIG. 9, the horizontal axis indicates the face-to-face angle α (°), and the vertical axis indicates the time difference Δt.

FIG. 9 shows that the time difference Δt is 0, for example, when the wearer and the speaker face each other in front of each other, that is, when the face-to-face angle α is 90° and the absolute value of the time difference Δt increases as the face-to-face angle α is shifted from 90°.

The face-to-face angle α may be calculated as described above. However, for example, the relationship between the face-to-face angle α and the time difference Δt based on FIG. 9 may be stored in the terminal apparatus 10 as an LOT (Look up Table), and the face-to-face angle α may be calculated by referring to this LUT after calculating the time difference Δt.

<Misidentification of the Face-to-Face Angle>

As described above, the wearer of the terminal apparatus 10 wears the strap 40 on the neck so that the apparatus body 30 is hung from the neck. Here, the wearer may wear the strap 40 on the neck in a state where the left and right sides of the terminal apparatus 10 are changed. That is, in a state where the apparatus body 30 is hung from the neck of the wearer, there are the case where the second microphone 11b is disposed at the left side and the third microphone 11c is disposed at the right side when viewed from the wearer and the opposite case where the third microphone 11c is disposed at the left side and the second microphone 11b is disposed at the right side when viewed from the wearer.

In addition, if the voice analysis unit 15 of the terminal apparatus 10 calculates the face-to-face angle α without checking the left and right arrangement of the second and third microphones 11b and 11c, the speaker's position may be erroneously recognized. Hereinafter, a case will be described in which the voice of a speaker reaches the third microphone 11c with a time difference Δt1 with the second microphone 11b as a reference.

Figure 10A:
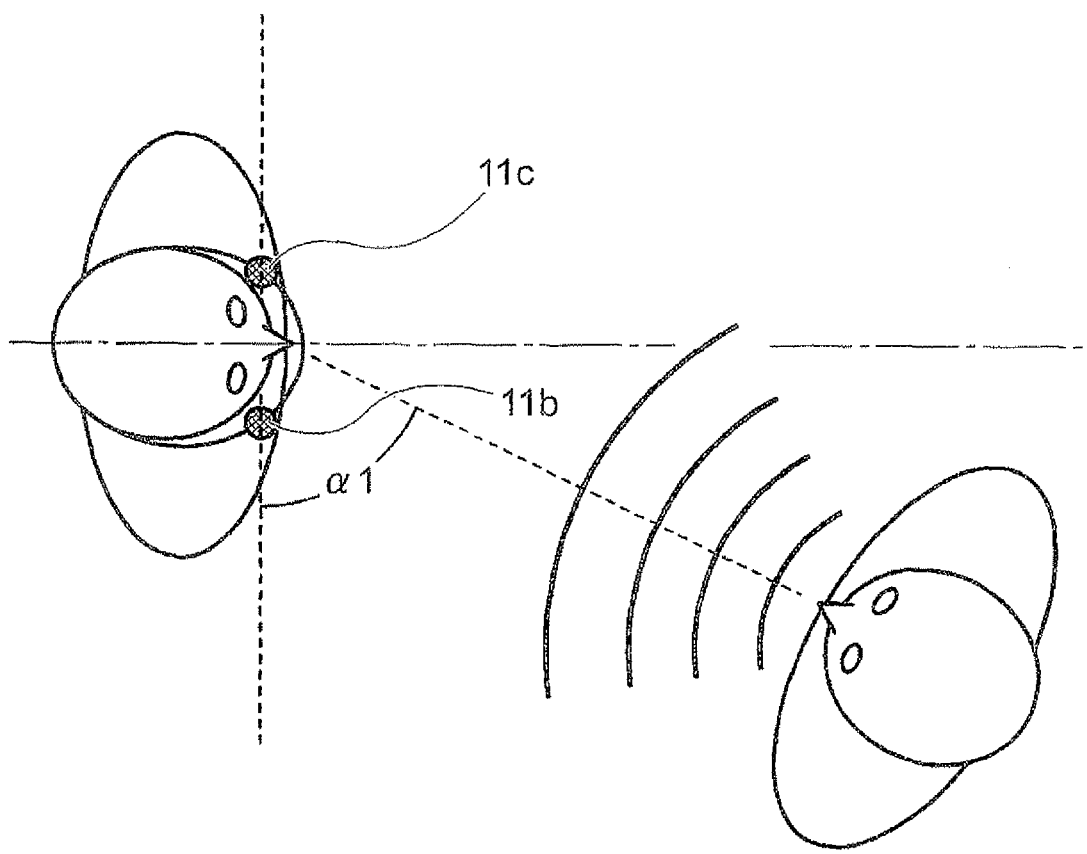
FIGS. 10A and 10B are views illustrating a state where the arrangement of the second and third microphones is erroneously recognized.
Figure 10B:
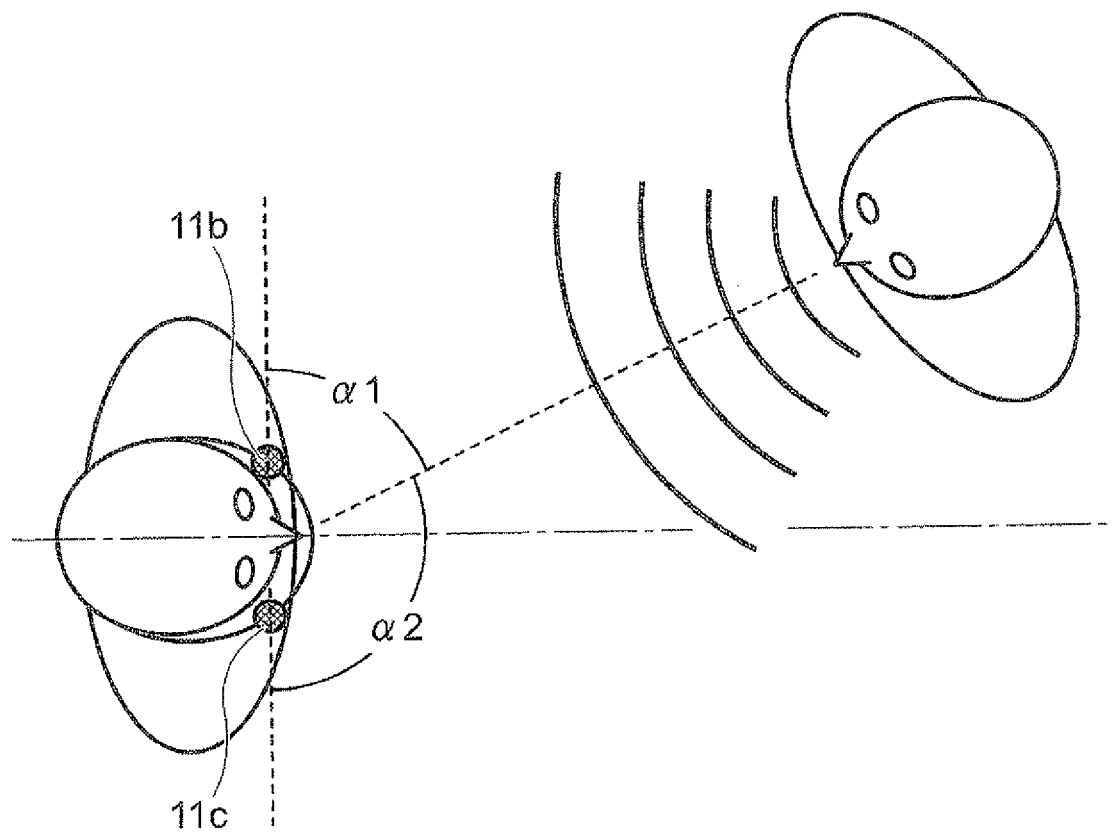

FIGS. 10A and 10B are views illustrating a state where the arrangement of the second and third microphones 11b and 11c is erroneously recognized.

As shown in FIG. 10A, it is assumed that the second and third microphones 11b and 11c acquire voices with the time difference Δt1 in a state where the second microphone 11b is disposed at the right side and the third microphone 11c is disposed at the left side when viewed from the wearer of the terminal apparatus 10. In this case, the face-to-face angle α becomes a face-to-face angle α1 (°), as shown in FIG. 10A.

Here, as shown in FIG. 10B, a case of the opposite arrangement to that of the terminal apparatus 10 shown in FIG. 10A is assumed. That is, the case is assumed where the second microphone 11b is disposed at the left side and the third microphone 11c is disposed at the right side when viewed from the wearer of the terminal apparatus 10. In addition, in this arrangement of the terminal apparatus 10, it is assumed that a speaker is located as shown in FIG. 10B, that is, a speaker is located at the position where the face-to-face angle is α2 (°). In addition, α2 satisfies the relationship of α2=180−α1. Accordingly, the position of the speaker shown in FIG. 10A and the position of the speaker shown in FIG. 10B are symmetrical with respect to the front direction when viewed from the wearer.

In the state shown in FIG. 10B, the time difference between voices acquired by the second and third microphones 11b and 11c is Δt1 which is the same as that in the above case shown in FIG. 10A.

Thus, even if the second and third microphones 11b and 11c acquire the voices with the same time difference Δt1, the face-to-face angle α may become the face-to-face angle α1 or may become the face-to-face angle α2 according to the arrangement of the second and third microphones 11b and 11c.

Therefore, the position of the speaker is erroneously recognized if the processing is performed on the assumption that the second and third microphones 11b and 11c are disposed as shown in FIG. 10A even though the second and third microphones 11b and 11c are actually disposed as shown in FIG. 10B, for example.

In addition, assuming that the actual positions of the second and third microphones 11b and 11c are horizontally reversed positions of the positions as assumption of the processing, the voice analysis unit 15 erroneously recognizes that the speaker is located at the position of a mirror image of the actual speaker in the front direction when viewed from the wearer. In addition, assuming that the direction of the terminal apparatus 10 is random when the wearer carries the terminal apparatus 10, an error that the voice analysis unit 15 misidentifies the position of the speaker may occur with a possibility of 50%.

<Recognition of the Position of a Microphone>

Next, in the present exemplary embodiment, the arrangement of the second and third microphones 11b and 11c is recognized on the basis of the voices acquired by the second and third microphones 11b and 11c. Specifically, in the present exemplary embodiment, the arrangement of the second and third microphones 11b and 11c is recognized by comparing the sound pressure of the second microphone 11b with the sound pressure of the third microphone 11c. Hereinafter, the configuration for recognizing the arrangement of each microphone will be specifically described.

Figure 11:
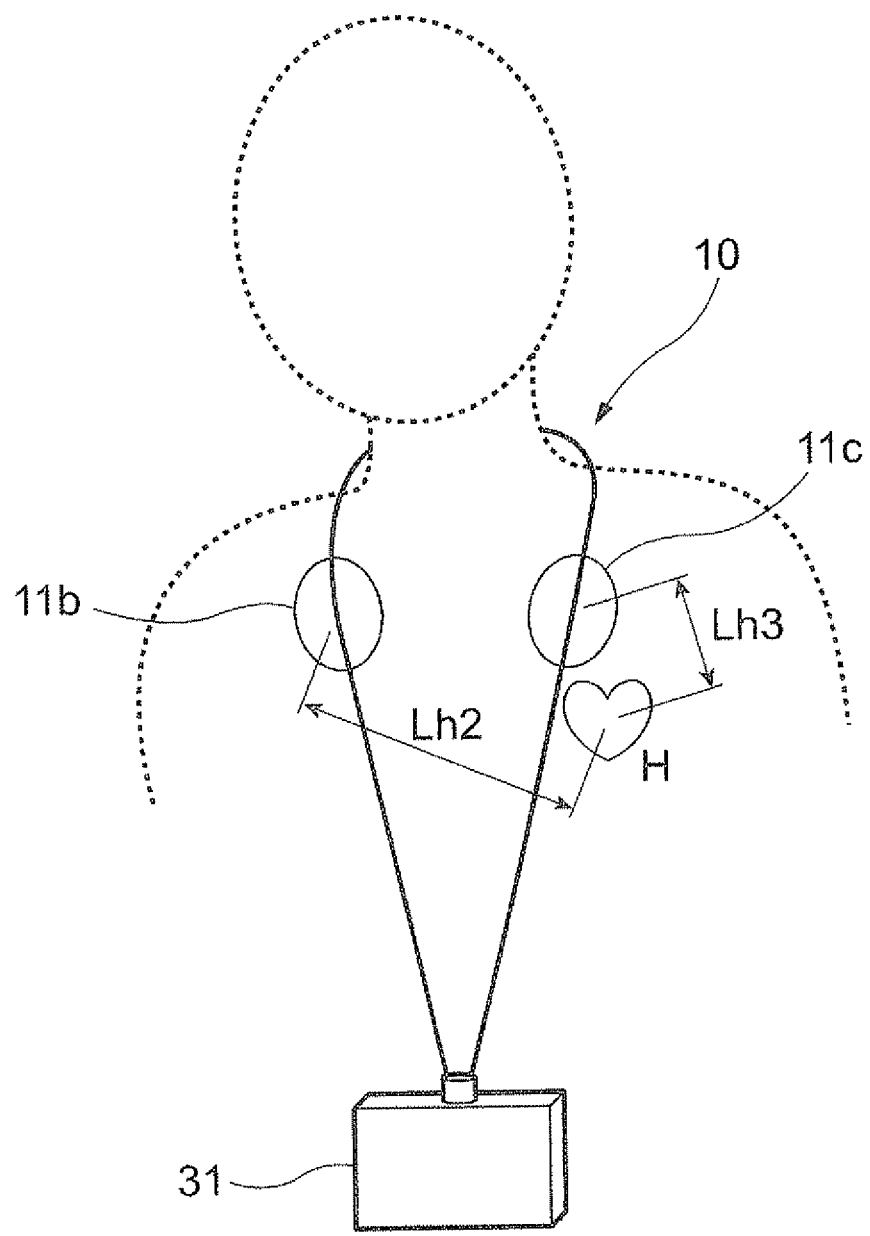
FIG. 11 is a view illustrating the positional relationship between the second and third microphones and the heart of the wearer.

FIG. 11 is a view illustrating the positional relationship between the second and third microphones 11b and 11c and the heart of the wearer.

In FIG. 11, when viewed from the wearer of the terminal apparatus 10, the second microphone 11b is disposed at the right side and the third microphone 11c is disposed at the left side. In addition, the heart of the wearer of the terminal apparatus 10 is located at the left side when viewed from the wearer. Here, assuming that the distance between the second microphone 11b and the heart H is Lh2 and the distance between the third microphone 11c and the heart H is Lh3, the following Expression (4) is satisfied.

$$Lh2 > Lh3 \quad (4)$$

As described with reference to FIG. 4, sound pressure of the acquired voice in the microphone 11 decreases as the distance between the microphone 11 and the sound source increases (distance decrease). Therefore, assuming that the sound pressure of a heart sound acquired by the second microphone 11b is Gh2 and the sound pressure of a heart sound acquired by the third microphone 11c is Gh3, the following Expression (5) is satisfied.

$$Gh2 < Gh3 \quad (5)$$

On the other hand, when the positions of the second and third microphones 11b and 11c are horizontally reversed positions of the positions in the example shown in FIG. 11, that is, when the second microphone 11b is disposed at the left side and the third microphone 11c is disposed at the right side, the following Expression (6) is satisfied between the distance Lh2 between the second microphone 11b and the heart and the distance Lh3 between the third microphone 11c and the heart.

$$Lh2 < Lh3 \quad (6)$$

In addition, the following Expression (7) is satisfied between the sound pressure Gh2 of a heart sound acquired by the second microphone 11b and the sound pressure Gh3 of a heart sound acquired by the third microphone 11c.

$$Gh2 > Gh3 \quad (7)$$

In the present exemplary embodiment, therefore, the voice analysis unit 15 (arrangement recognition unit) compares the sound pressure Gh2 of the heart sound acquired by the second microphone 11b with the sound pressure Gh3 of the heart sound acquired by the third microphone 11c. Then, as a result of the comparison of sound pressure, the voice analysis unit 15 determines that the microphone with larger sound pressure is disposed at the left side of the microphone with smaller sound pressure when viewed from the wearer.

In addition, the distance Lh2 between the second microphone 11b and the heart H and the distance Lh3 between the third microphone 11c and the heart H are shorter than the distance Lb2 between the mouth (sound source b) of another person and the second microphone 11b and the distance Lb3 between the mouth (sound source b) of another person and the third microphone 11c, respectively. Then, as described with reference to FIG. 4, in a region where the distance from the sound source is short, the attenuation curve is steep and the sound pressure changes greatly, compared with a region where the distance from the sound source is long. Accordingly, the sound pressure Gh2 and the sound pressure Gh3 are very different from each other, while the sound pressure Gb2 and the sound pressure Gb3 are almost equal.

Example of an Operation of a Terminal Apparatus

Figure 12:
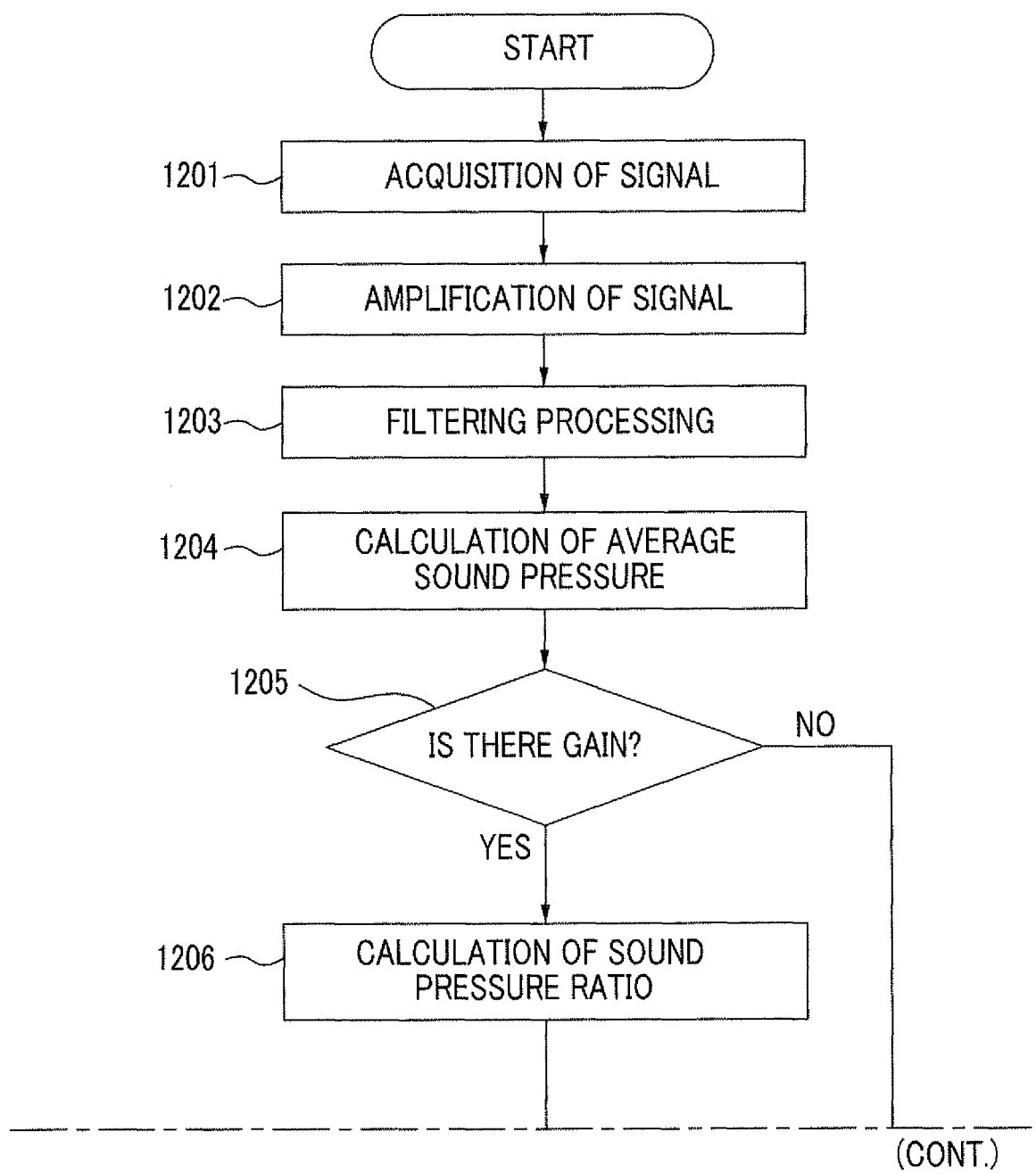
FIG. 12 is a flow chart showing the operation of the terminal apparatus in the exemplary embodiment.

FIG. 12 is a flow chart showing the operation of the terminal apparatus 10 in the present exemplary embodiment.

As shown in FIG. 12, when the microphone 11 of the terminal apparatus 10 acquires a voice, an electric signal (voice signal) corresponding to the acquired voice is transmitted from each microphone 11 to each corresponding amplifier 13 (step 1201). When the voice signal from each microphone 11 is acquired, each amplifier 13 amplifies the signal and transmits the amplified signal to the voice analysis unit 15 (step 1202).

The voice analysis unit 15 performs filtering processing on the signal amplified by each amplifier 13 to remove components of environmental sound from the signal (step 1203) Then, the voice analysis unit 15 calculates the average sound pressure in the voice acquired by each microphone 11 from the signal, from which noise components are removed, every fixed time unit (for example, few tenths of a second to few hundredths of a second) (step 1204).

When there is a gain of the average sound pressure in the first and second microphones 11a and 11b calculated in step 1204 (Yes in step 1205), the voice analysis unit 15 determines that there is a voice (speaking has been done). Then, the voice analysis unit 15 calculates the ratio (sound pressure ratio) of the average sound pressure in the first microphone 11a and the average sound pressure in the second microphone 11b (step 1206).

Then, when the sound pressure ratio calculated in step 1206 is larger than the threshold value (Yes in step 1207), the voice analysis unit 15 determines that the voice is from the wearer (step 1208). In addition, when the sound pressure ratio calculated in step 1206 is smaller than the threshold value (No in step 1207), the voice analysis unit 15 determines that the voice is from another person (step 1209). Then, the voice analysis unit 15 calculates a face-to-face angle (step 1210).

In addition, when there is no gain of the average sound pressure in the first and second microphones 11a and 11b calculated in step 1204 (No in step 1205), the voice analysis unit 15 determines that there is no voice (speaking has not been performed) (step 1211).

Then, the voice analysis unit 15 transmits the information (information regarding whether or not there is a voice, information regarding a speaker, and a face-to-face angle) obtained by the processing in steps 1204 to 1211, as an analysis result, to the host apparatus 20 through the data transmission unit 16 (step 1212). The length of speaking time of each speaker (wearer or another person), the value of the gain of average sound pressure, and other additional information items may be transmitted to the host apparatus 20 together with the analysis result.

In addition, in the present exemplary embodiment, determination regarding whether the voice is a voice from the wearer or a voice from another person is performed by comparing the sound pressure of the first microphone 11a with the sound pressure of the second microphone 11b. In the present exemplary embodiment, any kind of speaker identification may be performed if it is performed on the basis of the non-linguistic information extracted from the voice signals themselves acquired by the microphones 11 and 12, without being limited to the comparison of sound pressure. For example, determination of a speaker may be performed by calculating the time difference Δt in the first and second microphones 11a and 11b.

<Calculation of the Face-to-Face Angle>

Next, the flow when the voice analysis unit 15 calculates a face-to-face angle (step 1210 in FIG. 12) will be described in detail.

FIG. 13 is a flow chart when the voice analysis unit 15 in the present exemplary embodiment calculates a face-to-face angle.

As shown in FIG. 13, the voice analysis unit 15 calculates the time difference Δt when the voice of a speaker reaches the second and third microphones 11b and 11c (step 1301). In addition, using the method described with reference to FIG. 7, the face-to-face angle which is an angle between the wearer and the speaker facing each other is calculated on the basis of the time difference Δt and the distance D between the second and third microphones 11b and 11c (step 1302).

Then, the voice analysis unit 15 compares the second sound pressure, which is the average sound pressure in the second microphone 11b, with the third sound pressure, which is the average sound pressure acquired by the third microphone 11c (step 1303). Then, when the second sound pressure is larger than the third sound pressure (Yes in step 1303), the voice analysis unit 15 determines that the second microphone 11b is a left microphone that is a microphone disposed at the left side of the other microphone (third microphone 11c) when viewed from the wearer (step 1304).

In addition, when the third sound pressure is larger than the second sound pressure (No in step 1303), the voice analysis unit 15 determines that the third microphone 11c is a left microphone (step 1305). Then, the voice analysis unit 15 corrects the face-to-face angle calculated in step 1302 (step 1306). Specifically, assuming that the face-to-face angle calculated in step 1302 is αa (°) and the face-to-face angle after correction is αb (°), the correction is performed on the basis of the following Expression.

$$\alpha b = 180 - \alpha a \quad (8)$$

Then, the information regarding the face-to-face angle is transmitted to the host apparatus 20 through the data transmission unit 16 as described above (step 1212 in FIG. 12).

<Method of Acquiring a Signal of Heart Sound>

FIGS. 14A to 14D are views showing a change in sound pressure of a heart sound acquired by the microphone 11.

Figure 14A:
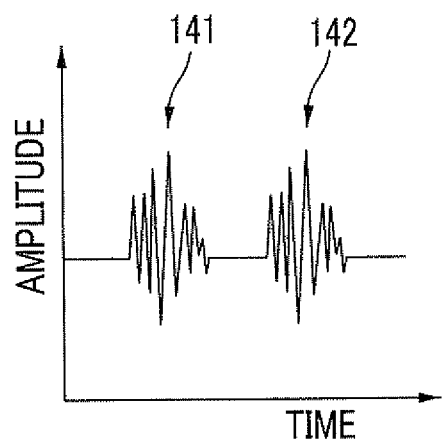
FIGS. 14A to 14D are views showing a change in sound pressure of a heart sound acquired by a microphone.

FIG. 14A shows a change in sound pressure (input volume) of the heart sound. In addition, FIG. 14A shows a waveform of a heart sound corresponding to two heartbeats (refer to 141 and 142 in the drawing). In addition, as shown in FIG. 14A, a high-frequency waveform is present in the waveform corresponding to one heartbeat. This waveform is a change in sound pressure occurring when plural valves (for example, an aortic valve or a mitral valve) are opened and closed, for example.

Here, it is possible to compare the sound pressure Gh2 and the sound pressure Gh3 of the heart sound with each other after removing changes in high-frequency sound pressure of the sound pressure of the heart sound acquired by the second and third microphones 11b and 11c.

Figure 14B:
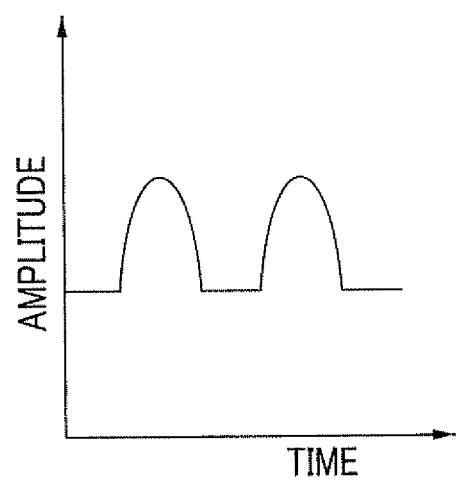

Here, the heart rate of an adult is about 80 to 200 times per minute (=1.5 to 3.3 Hz). In order to remove the high-frequency waveform which may become a noise source, it is possible to perform filtering processing by a known method using a low pass filter, which cuts off a signal with a frequency of 5 Hz or more, taking into consideration that the heart rate goes up at the time of excitement, for example. As shown in FIG. 14B, it is possible to further improve the accuracy in acquiring the sound pressure of a heart sound on the basis of a heart sound after removing the high-frequency waveform.

In addition, although the sound pressure Gh2 and the sound pressure Gh3 of the heart sound and the sound pressure Gb2 and the sound pressure Gb3 of the voice output from another person are regarded as sound pressure of voices acquired by the second and third microphones 11b and 11c without distinction in the above explanation, the invention is not limited to this.

Figure 14C:
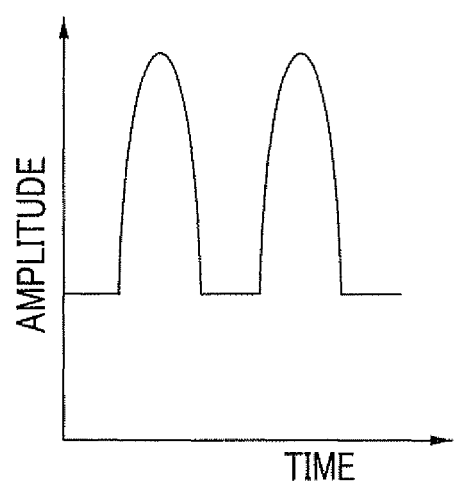

For example, the follow configuration may be adopted. That is, in a state where the voice analysis unit 15 has determined that there is no voice (speaking has not been done) (refer to step 1211 in FIG. 12), the amplification factor (gains) of the second and third amplifiers 13b and 13c may be increased to acquire the sound pressure Gh2 and the sound pressure Gh3 of the heart sound. For example, the sound pressure Gh2 and the sound pressure Gh3 of the heart sound may be detected by increasing the amplification rate of the heart sound (refer to FIG. 14B) after performing filtering processing using a low pass filter which cuts off a signal with a frequency of 5 Hz or more, as shown in FIG. 14C. Since sound pressure signals other than the heart sound are removed in this way, it is possible to further improve the accuracy in acquiring the sound pressure of the heart sound.

Figure 14D:
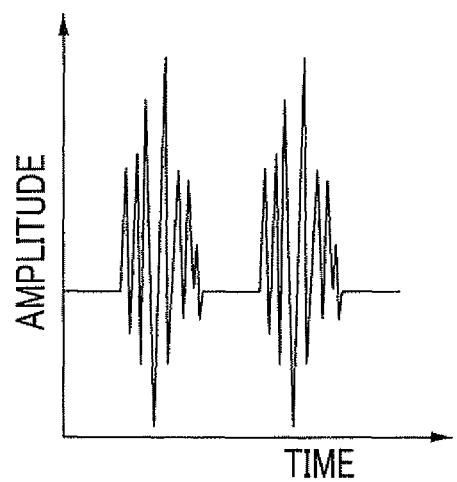

Alternatively, the follow configuration may be adopted. That is, a high-frequency waveform included in the waveform equivalent to one heartbeat may be detected by increasing the gains of the second and third amplifiers 13b and 13c without performing filtering processing using a low pass filter or the like in a state where the voice analysis unit 15 has determined that there is no voice, as shown in FIG. 14D. Since a heart sound is acquired in a state where there is no influence of a voice, it is possible to further improve the accuracy in acquiring the sound pressure of the heart sound.

In addition, the follow configuration may be adopted instead of acquiring the heart sound by increasing the gains of the second and third amplifiers 13b and 13c in a state where the voice analysis unit 15 has determined that there is no voice (refer to step 1211 in FIG. 12). That is, a heart sound may be acquired by increasing the gains of the second and third amplifiers 13b and 13c before the wearer and others speak immediately after the wearer puts on the terminal apparatus 10.

Application Example of a System and Functions of a Host Apparatus

In the system according to the present exemplary embodiment, information regarding the speaking (hereinafter, referred to as speaking information) obtained as described above by the plural terminal apparatuses 10 are collected in the host apparatus 20. Using the information acquired from the plural terminal apparatuses 10, the host apparatus 20 performs various analyses according to the purpose or aspect of use of the system. Hereinafter, an example will be described in which the present exemplary embodiment is used as a system that acquires the information regarding communication of plural wearers.

Figure 15:
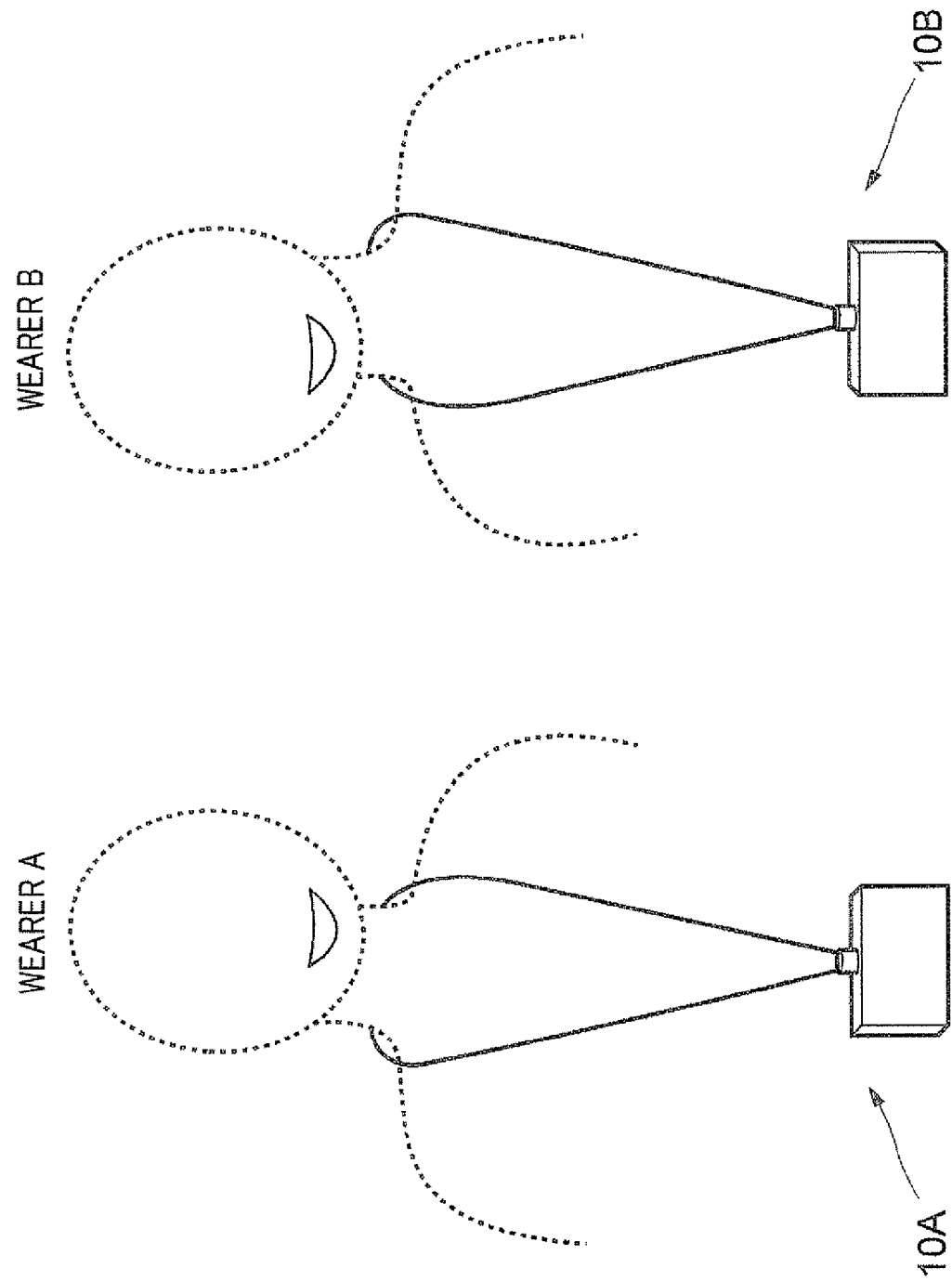
FIG. 15 is a view showing a situation where plural wearers who carry the terminal apparatus according to the exemplary embodiment have a conversation with each other.

FIG. 15 is a view showing a situation where plural wearers who carry the terminal apparatus 10 according to the present exemplary embodiment have a conversation with each other. FIG. 16 is a view showing an example of the speaking information of the terminal apparatuses 10A and 10B in the conversation situation shown in FIG. 15.

As shown in FIG. 15, a case is considered in which two wearers A and B each of whom carries the terminal apparatus 10 have a conversation with each other. In this case, a voice recognized as wearer's speaking in the terminal apparatus 10A of the wearer A is recognized as another person's speaking in the terminal apparatus 10B of the wearer B. On the contrary, a voice recognized as wearer's speaking in the terminal apparatus 10B is recognized as another person's speaking in the terminal apparatus 10A.

The speaking information is separately transmitted from the terminal apparatuses 10A and 10B to the host apparatus 20. In this case, identification results of a speaker (wearer and another person) in the speaking information acquired from the terminal apparatus 10A and the speaking information acquired from the terminal apparatus 10B are opposite as shown in FIG. 16, but the information showing the speaking situation, such as the length of speaking time or the speaker change timing, is similar. Therefore, the host apparatus 20 in this application example determines that such information items indicate the same speaking situation by comparing the information acquired from the terminal apparatus 10A with the information acquired from the terminal apparatus 10B, and recognizes that the wearers A and B have a conversation. Here, at least the time information regarding the speaking, such as the length of speaking time in each speaking of each speaker, start time and end time of each speaking, and speaker change time (timing), is used as the information showing the speaking situation. In addition, in order to determine the speaking situation related to a specific conversation, only some of the time information regarding the speaking may be used, or other information may be additionally used.

More specifically, in the present exemplary embodiment, the face-to-face angle which is an angle between a wearer and a speaker facing each other is separately transmitted from the terminal apparatuses 10A and 10B to the host apparatus 20 as described above. Therefore, on the basis of the face-to-face angles acquired from the terminal apparatuses 10A and 10B, it may be recognized more accurately that the wearers A and B have a conversation.

Figure 17:
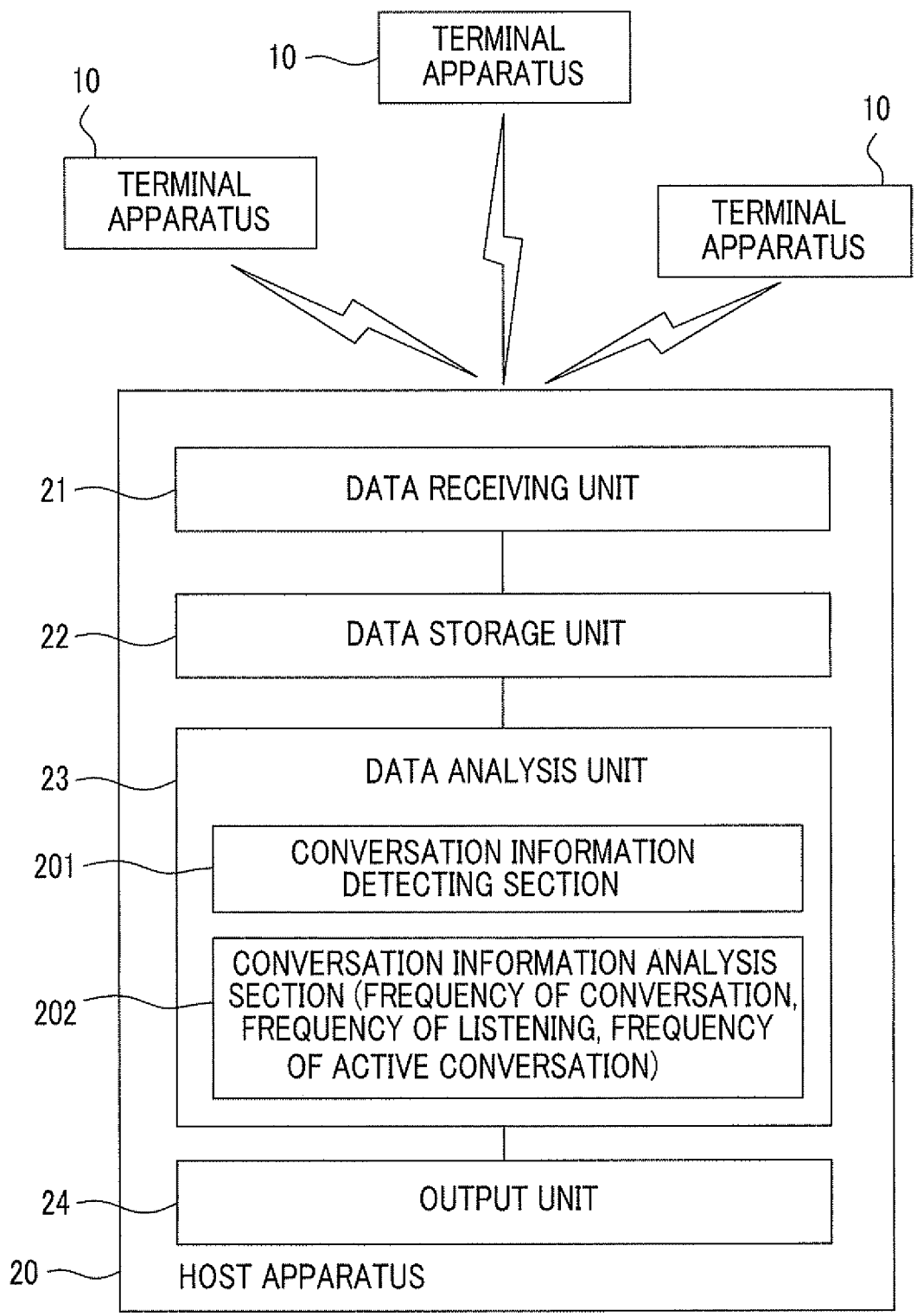
FIG. 17 is a view showing an example of the functional configuration of the host apparatus in the exemplary embodiment.

FIG. 17 is a view showing an example of the functional configuration of the host apparatus 20 in this application example.

In this application example, the host apparatus 20 includes a conversation information detecting section 201 that detects the speaking information (hereinafter, referred to as conversation information) from the terminal apparatus 10 of the wearer in conversation, among the speaking information items acquired from the terminal apparatus 10, and a conversation information analysis section 202 that analyzes the detected conversation information. The conversation information detecting section 201 and the conversation information analysis section 202 are realized as a function of the data analysis unit 23.

Also from the terminal apparatus 10 other than the terminal apparatuses 10A and 10B, the speaking information is transmitted to the host apparatus 20. The speaking information from each terminal apparatus 10 which is received by the data receiving unit 21 is stored in the data storage unit 22. In addition, the conversation information detecting section 201 of the data analysis unit 23 reads the speaking information of each terminal apparatus 10 stored in the data storage unit 22 and detects the conversation information which is the speaking information related to a specific conversation.

As shown in FIG. 16, from the speaking information of the terminal apparatus 10A and the speaking information of the terminal apparatus 10B, the characteristic relationship which is different from the speaking information of other terminal apparatuses 10 is extracted. The conversation information detecting section 201 compares the speaking information that is acquired from each terminal apparatus 10 and is stored in the data storage unit 22, detects the speaking information with the above-described relationship from the speaking information acquired from the plural terminal apparatuses 10, and identifies it as conversation information related to the same conversation. The speaking information from the plural terminal apparatuses 10 is constantly transmitted to the host apparatus 20. Accordingly, the conversation information detecting section 201 determines whether or not the conversation information related to the specific conversation is included by performing the processing as described above while separating the speaking information in a fixed period sequentially, for example.

In addition, the conditions required when the conversation information detecting section 201 detects the conversation information related to a specific conversation from the speaking information of the plural terminal apparatuses 10 are not limited to the relationship shown in FIG. 16 described above. Any detection method may be used as long as it is possible to identify the conversation information related to a specific conversation from plural speaking information items.

In addition, although the case where two wearers each of whom carries the terminal apparatus 10 have a conversation is shown in the above example, the number of persons participating in a conversation is not limited to two persons. When three or more wearers have a conversation, the terminal apparatus 10 carried by each wearer recognizes a voice of the wearer of the host apparatus as a voice of the wearer and distinguishes it from voices of others (two or more persons). However, the information showing the speaking situation, such as speaking time or speaker change timing, is similar among the acquired information in each terminal apparatus 10. Therefore, similar to the case where two persons have a conversation, the conversation information detecting section 201 detects the speaking information acquired from the terminal apparatuses 10 of wearers participating in the same conversation and distinguishes it from the speaking information acquired from the terminal apparatuses 10 of wearers not participating in the conversation.

Then, the conversation information analysis section 202 analyzes the conversation information detected by the conversation information detecting section 201 and extracts the features of the conversation. In the present exemplary embodiment, as a specific example, the features of the conversation are extracted on the basis of three kinds of criteria for evaluation, that is, the degree of interaction, the degree of listening, and the degree of conversation activity. Here, the degree of interaction is assumed to indicate the balance of the speaking frequency of a conversation participant. The degree of listening is assumed to indicate the degree of listening to others in each conversation participant. The degree of conversation activity is assumed to indicate the density of speaking in the entire conversation.

The degree of interaction is specified by the number of times of speaker changes during the conversation and a variation in time taken until the speaker is changed (time for which one speaker speaks continuously). This may be obtained from the number of times of speaker changes and the time when the speaker change occurs in the conversation information in a fixed period. In addition, it is assumed that the value (level) of the degree of interaction increases as the number of times of speaker changes increases, that is, as a variation in continuous speaking time of each speaker decreases. This criterion for evaluation is common in all conversation information items (speaking information of each terminal apparatus 10) related to the same conversation.

The degree of listening is specified by the ratio of speaking time of each conversation participant and speaking time of others in conversation information.

$$\text{Degree of listening} = (\text{speaking time of others})/(\text{speaking time of a wearer})$$

This criterion for evaluation differs with the speaking information acquired from the terminal apparatus 10 of each conversation participant even in the conversation information related to the same conversation.

The degree of conversation activity is an index showing the so-called excitement of the conversation, and is specified by the ratio of silence time (time for which none of conversation participants speak) to the total conversation time. It is assumed that the value (level) of the degree of conversation activity increases as the total silence time becomes short (which means that any one of conversation participants speaks in the conversation). This criterion for evaluation is common in all conversation information items (speaking information of each terminal apparatus 10) related to the same conversation.

As described above, the features of a conversation related to the conversation information are extracted by the conversation information analysis of the conversation information analysis section 202. In addition, the way of participation of each participant in the conversation is specified by performing the analysis as described above. In addition, the above criteria for evaluation are just examples showing the features of a conversation, and criteria for evaluation according to the purpose or aspect of use of the system of the present exemplary embodiment may be set by adopting other evaluation criteria or giving a weighting to each item.

The tendency of communication in a group to which the wearer of the terminal apparatus 10 belongs may be analyzed by performing the above analysis for various kinds of conversation information detected by the conversation information detecting section 201 among the speaking information items stored in the data storage unit 22. Specifically, the tendency of conversation in a wearer's group may be determined by checking the number of conversation participants, conversation time, correlation between the values, such as the degree of interaction and the degree of conversation activity, and the occurrence frequency of conversation, for example.

In addition, the communication tendency of each wearer may be analyzed by performing the analysis as described above for plural conversation information items of a specific wearer. The way of participation of a specific wearer in the conversation may have a certain tendency according to the conditions, such as a conversation partner or the number of conversation participants. Therefore, it may be expected that the features, such as "the level of interaction increases in a conversation with a specific partner" or "the degree of listening becomes large if the number of conversation participants increases", are detected by examining the plural conversation information items in a specific wearer.

In addition, the speaking information identification processing and the conversation information analysis processing described above just show the application example of the system according to the present exemplary embodiment, and do not limit the purpose or aspect of use of the system according to the present exemplary embodiment, the function of the host apparatus 20, and the like. The processing function for executing various kinds of analyses and examinations for the speaking information acquired by the terminal apparatus according to the present exemplary embodiment may be realized as a function of the host apparatus 20.

<Modifications>

In the exemplary embodiment described above, the second and third microphones 11b and 11c are symmetrically disposed in a state where the user wears the apparatus. In addition, the symmetric arrangement in the present exemplary embodiment does not necessarily mean that the second and third microphones 11b and 11c are located in a line in the horizontal direction. In the present exemplary embodiment, it is preferable that one of the second and third microphones 11b and 11c located at the left side when viewed from the wearer be disposed so as to be closer to the heart than the other microphone located at the right side is. More specifically, it is preferable that, even if the arrangement of left and right sides of the terminal apparatus 10 is changed when the wearer wears the terminal apparatus 10 on the neck, a microphone located at the left side be disposed so as to be closer to the heart than a microphone located at the right side is in any state.

In addition, a wearer may wear the microphone 11 (first to third microphones 11a to 11c) using various methods. For example, each microphone 11 may be separately fixed to clothes using a pin or the like. In addition, it is also possible to prepare a dedicated mounting fixture designed so that each microphone 11 is fixed at a desired position.

In addition, the configuration of the apparatus body 30 is not limited to the configuration shown in FIG. 2 in which the apparatus body 30 is connected to the strap 40 so as to be hung from the neck of the wearer, and the apparatus body 30 may be formed as a device which is easily carried. For example, the apparatus body 30 may be mounted on clothes or the body using a clip or a belt instead of the strap in the present exemplary embodiment, or the apparatus body 30 may be simply carried in a pocket or the like. In addition, mobile phones or known portable electronic information terminals may be configured to realize a function of receiving a voice signal from the microphone 11 and amplifying and analyzing the voice signal.

In addition, the microphone 11 and the apparatus body 30 (or the voice analysis unit 15) may be wirelessly connected to each other instead of connection using a cable. Although the amplifier 13, the voice analysis unit 15, the data transmission unit 16, and the power supply unit 17 are housed in the single case 31 in the above example of the configuration, they may be grouped into plural parts. For example, the power supply unit 17 may be connected to an external power supply without being housed in the case 31.

The foregoing description of the exemplary embodiments of the invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention is defined by the following claims and their equivalents.

What is claimed is:

1. A voice analyzer comprising:
an apparatus body;
a strap that is connected to the apparatus body and is used to make the apparatus body hung from a neck of a wearer;
a first voice acquisition unit that acquires a voice of a speaker and that, when the strap is hung on the neck of the wearer, is disposed in either a left strap or a right strap when viewed from the wearer;
a second voice acquisition unit that acquires the voice of the speaker and that, when the strap is hung on the neck of the wearer, is disposed in the opposite strap in which the first voice acquisition unit is disposed; and
an arrangement recognition unit that recognizes arrangements of the first voice acquisition unit and the second voice acquisition unit indicating whether the first voice acquisition unit and the second voice acquisition unit are disposed in either the left strap or the right strap, when viewed from the wearer, by comparing a voice signal of the voice acquired by the first voice acquisition unit with sound pressure of a heart sound of the wearer acquired by the second voice acquisition unit.

2. The voice analyzer according to claim 1, further comprising:
a third voice acquisition unit that acquires a voice and is disposed at a position where a distance from a mouth of the wearer is different from a distance from the mouth of the wearer to the first voice acquisition unit; and
a speaker identification unit that identifies whether the voices acquired by the first and third voice acquisition units are voices of the wearer or voices of others by comparing the voice signals of the voices acquired by the first and third voice acquisition units.

3. The voice analyzer according to claim 1, further comprising:
a calculation unit that calculates a face-to-face angle, which is an angle between the wearer and another person facing each other, on the basis of the voices acquired by the first and second voice acquisition units.

4. The voice analyzer according to claim 2, further comprising:
a calculation unit that calculates a face-to-face angle, which is an angle between the wearer and another person facing each other, on the basis of the voices acquired by the first and second voice acquisition units.

5. A voice analyzer comprising:
two voice acquisition units that acquire a voice;
a holding unit that separates the two voice acquisition units from each other in a horizontal direction on a chest of the wearer and that holds one of the two voice acquisition units, which is disposed at a left side when viewed from the wearer, at a position where a distance to a heart of the wearer is shorter than a distance from the other one of the two voice acquisition units to the heart of the wearer and holds the two voice acquisition units such that an arrangement of the two voice acquisition units whether the two voice acquisition units being disposed either on the left side or the right side when viewed from the wearer is changeable; and an arrangement recognition unit that recognizes the arrangement of the two voice acquisition units when viewed from the wearer by comparing sound pressure of heart sounds of the wearer acquired by the two voice acquisition units.

* * * * *